United States Patent
Nakamura et al.

(10) Patent No.: US 6,579,394 B1
(45) Date of Patent: Jun. 17, 2003

(54) METHOD OF PRODUCING CERAMIC SLURRY, CERAMIC SLURRY COMPOSITION, CERAMIC GREEN SHEET AND MULTILAYER CERAMIC ELECTRONIC PART

(75) Inventors: Ichiro Nakamura, Kusatsu (JP); Kazuyuki Naka, Otsu (JP)

(73) Assignee: Murata Manufacturing Co., Ltd (JP)

( * ) Notice: Subject to any disclaimer, the term of this patent is extended or adjusted under 35 U.S.C. 154(b) by 0 days.

(21) Appl. No.: 09/620,256

(22) Filed: Jul. 21, 2000

(30) Foreign Application Priority Data

| Jul. 23, 1999 | (JP) | ............................................. | 11-208607 |
| Jul. 23, 1999 | (JP) | ............................................. | 11-208608 |
| Oct. 5, 1999 | (JP) | ............................................. | 11-283934 |
| Nov. 11, 1999 | (JP) | ............................................. | 11-320857 |

(51) Int. Cl.$^7$ ............................. B32B 31/26; B28C 1/04
(52) U.S. Cl. ................................ 156/89.12; 156/89.16; 264/650; 264/670; 241/16
(58) Field of Search ............................ 156/89.12, 89.14, 156/89.16, 246; 264/614, 615, 616, 617, 669, 670, 650; 501/1, 94; 241/15, 16

(56) References Cited

U.S. PATENT DOCUMENTS

| 4,836,966 A | * | 6/1989 | Shimuzu et al. |
| 5,852,076 A | * | 12/1998 | Serafin et al. |
| 5,967,964 A | * | 10/1999 | Hattori et al. |
| 2001/0002606 A1 | * | 6/2001 | Nakamura et al. |

FOREIGN PATENT DOCUMENTS

| DE | 199 14 330 | 5/2000 |
| DE | 199 28 918 | 12/2000 |
| EP | 0 766 997 | * 4/1997 |
| EP | 0876 841 | 11/1998 |
| GB | 2 063 695 | * 6/1981 |
| JP | 4-263902 | * 9/1992 |
| JP | 4-325453 | 11/1992 |
| JP | 11-99514 | * 4/1999 |

OTHER PUBLICATIONS

Japanese Office Action issued Feb. 25, 2003 (w/ English translation).
German Office Action issued Apr. 1, 2003 (w/ English translation).

* cited by examiner

Primary Examiner—Curtis Mayes
(74) Attorney, Agent, or Firm—Dickstein, Shapiro, Morin & Oshinsky, LLP.

(57) ABSTRACT

A method of producing ceramic slurry capable of producing uniformly dispersed ceramic slurry without excessively damaging a ceramic powder, and a method of producing a ceramic slurry composition used for producing a multilayer ceramic electronic part, from which an undissolved binder is precisely removed. Also provided is a method of producing a ceramic green sheet, and a method of producing a multilayer ceramic electronic part. A ceramic powder having an average particle diameter of about 0.01 to 1 μm is mixed with a dispersion solvent (solvent) and disintegrated by a medium-type dispersion method using a dispersion medium such as balls, beads, or the like to obtain mixed and disintegrated slurry, followed by high-pressure dispersion under a pressure of about 100 kg/cm$^2$ or more. The ceramic slurry composition contains a ceramic powder, a dispersant, a binder, and a solvent, wherein a binder solution prepared by mixing a solvent and the binder to form a solution, and dispersing the binder under a high pressure of about 100 kg/cm$^2$ or more is used as the binder to decrease the content of the undissolved binder.

26 Claims, 4 Drawing Sheets

METHOD OF PRODUCING CERAMIC SLURRY, CERAMIC SLURRY COMPOSITION, CERAMIC GREEN SHEET AND MULTILAYER CERAMIC ELECTRONIC PART

BACKGROUND OF THE INVENTION

1. Field of the Invention

The present invention relates to methods of producing ceramic slurry, a ceramic slurry composition and a ceramic green sheet used for manufacturing a multilayer ceramic electronic part, and a method of producing a multilayer ceramic electronic part. Particularly, the present invention relates to methods of producing ceramic slurry and a ceramic slurry composition used for manufacturing a multilayer ceramic electronic part such as a monolithic ceramic capacitor, a ceramic multilayered substrate, etc., and methods of producing a ceramic green sheet and a multilayer ceramic electronic part using the ceramic slurry or the ceramic slurry composition.

2. Description of the Related Art

A multilayer ceramic electronic part such as a monolithic ceramic capacitor, a ceramic multilayered substrate, or the like is usually manufactured through the steps of laminating ceramic green sheets, compressing the laminated ceramic green sheets, and then heat-treating the laminated product to sinter ceramic and electrodes.

For example, in manufacturing a monolithic ceramic capacitor having a structure in which internal electrodes 2 are provided in a ceramic element 1, and a pair of external electrodes 3a and 3b are provided to be connected to the internal electrodes 2 which alternately lead to the different side ends, as shown in FIG. 1, the following method is used.

(1) First, a capacity forming internal electrode is provided on a ceramic green sheet to form a sheet 11 provided with an electrode (FIG. 2).

(2) Next, a predetermined number of the sheets 11 provided with electrodes are laminated, and ceramic green sheets (outer layer sheets) 21 without electrodes are laminated on the upper and lower sides of the laminated sheets, followed by compression to form a laminated product (laminated compressed body) in which the ends of the internal electrodes 2 are alternately end at the different side ends.

(3) The laminated compressed body is burned under predetermined conditions to sinter the ceramic, and then conductive paste is coated at both ends of the laminated product (ceramic element) 1 (FIG. 1) after burning, and baked to form the external electrodes 3a and 3b (FIG. 1) connected to the internal electrodes 2. As a result, the monolithic ceramic capacitor shown in FIG. 1 is obtained.

Other multilayer ceramic electronic parts such as a laminated ceramic multilayered substrate, etc. are also manufactured through the step of laminating ceramic green sheets.

Each of the ceramic green sheets used for manufacturing the multilayer ceramic electronic parts is generally produced by a method in which a ceramic powder is mixed with a dispersion medium (solvent), a dispersant, a binder, a plasticizer, etc., at a predetermined ratio, and disintegrated by using a medium-type dispersing machine such as a bead mill, a ball mill, an attritor, a paint shaker, a sand mill or the like, to produce ceramic slurry and the thus-produced ceramic slurry is formed in a sheet having a predetermined thickness by the doctor blade method, and then dried.

In recent years, various multilayer ceramic electronic parts such as a monolithic ceramic capacitor, like other electronic devices, have been required to have a smaller size and higher performance. Therefore, the ceramic green sheets used for manufacturing the multilayer ceramic electronic part are required to have a small thickness, thereby causing the need to use very thin ceramic green sheets having a thickness of 10 $\mu$m or less.

In order to product such a thin ceramic green sheet, a ceramic slurry comprising a ceramic raw material sufficiently dispersed therein must be used for producing the ceramic green sheets, and thus a ceramic raw material comprising a fine powder having an average particle diameter of about 0.01 to 1.0 $\mu$m must be used as a ceramic raw material powder.

However, the conventional method of producing ceramic slurry comprising mixing the ceramic powder with a dispersion medium (solvent), a dispersant, a binder, a plasticizer, etc., at a predetermined ratio and then disintegrating the mixture by using a medium-type dispersing machine such as a bead mill, a ball mill, an attritor, a paint shaker, a sand mill or the like, makes it difficult to sufficiently disperse the ceramic fine powder of about 1.0 $\mu$m or less. Under actual conditions, therefore, ceramic slurry having dispersion uniformity cannot be obtained, thereby causing difficulties in producing a high-quality thin ceramic green sheet.

Namely, the ceramic green sheet produced by using the ceramic slurry produced by the above-described conventional method has problems in that (1) the surface smoothness is insufficient, (2) a high density and sufficient tensile strength cannot be obtained, and (3) the rate of shrinkage varies with positions in the burning step after lamination due to nonuniform distribution of resins such as the binder, the plasticizer, etc., to fail to obtain sufficient dimensional precision. Particularly, these problems become significant when using a binder having a high degree of polymerization.

In some cases, the conventional method of producing a ceramic slurry comprises dispersing the ceramic powder by forcedly applying collision or impact using a ball mill filled with balls, or a bead mill filled with beads in order to improve dispersibility. In this case, there is a problem in that the ceramic powder is greatly damaged due to the excessive disintegration force of collision or impact to cause deterioration in crystallinity of the ceramic powder and an increase in the specific surface area, thereby failing to obtain a multilayer ceramic electronic part having desired electric properties.

In some cases, a high-pressure dispersion method is used in which slurry containing a ceramic powder is caused to flow under high pressure so that the ceramic powder is dispersed by collision or impact force. However, in this method, the high-pressure disintegration force alone is lower than the method of disintegrating by forced collision or impact using the medium-type dispersing machine such as a ball mill, a bead mill, or the like, causing difficulties in sufficiently disintegrating strongly agglomerated particles. There is thus a problem in that since sufficiently dispersed ceramic slurry cannot be produced, and a high-quality ceramic green sheet cannot be obtained.

Another dispersion method comprises causing a slurry containing a ceramic powder and discharged from a small orifice or nozzle by applying high pressure thereto to collide with a solid wall of a hard material, for example, such as cemented carbide, ceramic, diamond, or the like, or causing the materials discharged from a plurality of small orifices or nozzles to collide with each other. In this method, when the same energy as the above high-pressure dispersion system is applied to the slurry, the stress loaded on the flowing ceramic powder can be increased. However, even when strongly agglomerated particles can be disintegrated, a sufficiently dispersed ceramic slurry cannot be produced because of poor uniformity, thereby causing the problem of failing to obtain a high-quality ceramic green sheet.

Furthermore, defects such as pinholes readily occur in the thin ceramic green sheet, and the use of such ceramic green sheets for manufacturing the monolithic ceramic capacitor shown in FIG. 1 causes a short circuit (short circuit failure) between the internal electrodes 2 opposed to each other with the ceramic layer formed therebetween.

The defects of the ceramic green sheet which cause such a short circuit failure, are mainly produced due to the presence of the undissolved binder in the ceramic slurry used for producing the ceramic green sheet. The content of the undissolved binder is found to greatly influence the rate of occurrence of the short circuit failure.

As the binder used for the ceramic slurry used for producing the ceramic green sheet, a polyvinyl butyral resin, a cellulose resin, an acrylic resin, a vinyl acetate resin, a polyvinyl alcohol resin or the like, is generally used. In general, a binder solution is used, which is prepared by mixing and stirring such a binder and a solvent such as toluene, xylene, ethyl alcohol, isopropyl alcohol, butyl alcohol, or the like.

However, the binder cannot be completely dissolved in the solvent only by mixing and stirring the binder and the solvent, and thus undissolved material remains in the binder solution. Although a possible method of separating and removing the undissolved material is filtration, the binder solution has high viscosity and thus high resistance in filtration, thereby limiting use of a filter having a small pore size. Under actual conditions, it is difficult to completely remove the undissolved material.

Another possible method comprises filtering the ceramic slurry after the binder containing the undissolved material is added. However, this method is limited because a filter having a small pore size is easily clogged with the ceramic powder.

SUMMARY OF THE INVENTION

The present invention has been achieved in consideration of the above situation, and an object of the present invention is to provide methods of producing ceramic slurry and a ceramic slurry composition from which an undissolved binder is precisely removed, and methods of producing a ceramic green sheet and a multilayer ceramic electronic part using the ceramic slurry or ceramic slurry composition.

In order to achieve the object of the present invention, a method of producing ceramic slurry used for producing a ceramic electronic part comprises the mixing disintegration step of mixing a ceramic powder having an average particle diameter of about 0.01 to 1 $\mu$m with a dispersion solvent and disintegrating the ceramic powder by a medium-type dispersion method using a dispersion medium such as balls, beads, or the like to obtain mixed and disintegrated slurry, and the high-pressure dispersion step of dispersing the mixed and disintegrated slurry under a high pressure of about 100 kg/cm$^2$ or more to obtain disperse slurry. The ceramic powder having an average particle diameter of about 0.01 to 1 $\mu$m is mixed with the dispersion solvent, and disintegrated by the medium-type dispersion method using the dispersion medium such as balls, beads, or the like to obtain the mixed and disintegrated slurry, and the mixed and disintegrated slurry is dispersed under a high pressure of about 100 kg/cm$^2$ or more to obtain disperse slurry in which the ceramic powder is sufficiently dispersed. Namely, the ceramic powder is dispersed by a combination of the medium-type dispersion method and the high-pressure dispersion method so that the ceramic powder can be uniformly dispersed while suppressing deterioration in crystallinity of the ceramic powder and an excessive increase in the specific surface area, thereby producing high-quality ceramic slurry.

In the present invention, as the dispersion solvent, a solvent containing a dispersant, a plasticizer, and an antistatic agent can be used, and other additives may be added to the solvent.

In the present invention, the high-pressure dispersion means is a wide concept which means the method of dispersing slurry by using a high-pressure dispersing apparatus in which a solution to be dispersed under high pressure is caused to collide with a wall or passed through a passage with a diameter gradually decreased by a taper.

Although the present invention is advantageously applied to a case in which the ceramic powder has an average particle diameter (an average primary particle diameter measured by an electron microscope) which lies in the range of about 0.01 to 1 $\mu$m, the present invention can also be applied to a case in which the average particle diameter is beyond the range of about 0.01 to 1 $\mu$m.

In the method of producing ceramic slurry of the present invention, mixing and disintegration may be performed by the medium-type dispersion method with a binder added.

Even when the mixing disintegration step is performed with a binder added, the ceramic powder can be uniformly dispersed without excessive damage to the ceramic powder to produce high-quality ceramic slurry.

The time of addition of the binder is not limited, and the binder may be previously mixed with the dispersion solvent or mixed at the time the ceramic powder is dispersed in the dispersion solvent.

In another aspect of the present invention, a method of producing ceramic slurry used for manufacturing a ceramic electronic part comprises the mixing disintegration step of mixing a ceramic powder having an average particle diameter of about 0.01 to 1 $\mu$m with a dispersion solvent containing no binder and disintegrating the ceramic powder by a medium-type dispersion method using a dispersion medium such as balls, beads, or the like to obtain mixed and disintegrated slurry, and the high-pressure dispersion step of adding the binder to the mixed and disintegrated slurry and dispersing the resultant mixture under a high pressure of about 100 kg/cm$^2$ or more to obtain disperse slurry.

The ceramic powder is mixed with the dispersion solvent containing no binder, and disintegrated by the medium-type dispersion method to obtain the mixed and disintegrated slurry, and the binder is added to the mixed and disintegrated slurry, followed by dispersion under a high pressure of about 100 kg/cm$^2$ or more to obtain a slurry in which the ceramic powder is sufficiently dispersed.

Namely, the binder is partially gelled in the dispersion solvent in some cases, and thus the ceramic powder is mixed with the dispersion solvent and disintegrated by the medium-type dispersion method before the binder is added to improve the efficiency of mixing and disintegration, as compared with mixing and disintegration of the ceramic powder in a partially gelled state by the medium-type dispersion is method. Therefore, the final dispersibility of the ceramic powder can be further improved.

In still another aspect of the present invention, a method of producing ceramic slurry used for manufacturing a ceramic electronic part comprises the mixing disintegration step of mixing a ceramic powder having an average particle diameter of about 0.01 to 1 μm with a dispersion solvent containing no binder and disintegrating the ceramic powder by a medium-type dispersion method using a dispersion medium such as balls, beads, or the like to obtain mixed and disintegrated slurry, the primary high-pressure dispersion step of dispersing the mixed and disintegrated slurry under a high pressure of about 100 kg/cm$^2$ or more to obtain primary disperse slurry, and the secondary high-pressure dispersion step of adding the binder to the primary mixed and disintegrated slurry and further dispersing the resultant mixture under a high pressure of about 100 kg/cm$^2$ or more to obtain secondary disperse slurry (final disperse slurry).

The ceramic powder is mixed with the dispersion solvent containing no binder, and disintegrated by the medium-type dispersion method to obtain the mixed and disintegrated slurry, and the mixed and disintegrated slurry is dispersed under a high pressure of about 100 kg/cm$^2$ or more to obtain the primary disperse slurry. The binder is added to the primary disperse slurry, followed by further dispersion under a high pressure of about 100 kg/cm$^2$ or more to obtain the secondary disperse slurry. In this case, the ceramic powder can uniformly be dispersed without excessive damage to the ceramic powder, thereby producing high-quality ceramic slurry.

In a further aspect of the present invention, a method of producing ceramic slurry used for manufacturing a ceramic electronic part comprises the primary mixing disintegration step of mixing a ceramic powder having an average particle diameter of about 0.01 to 1 μm with a dispersion solvent containing no binder and disintegrating the ceramic powder by a medium-type dispersion method using a dispersion medium such as balls, beads, or the like to obtain primary mixed and disintegrated slurry, the secondary mixing disintegration step of adding the binder to the primary mixed and disintegrated slurry, and mixing and disintegrating the resultant mixture by a medium-type dispersion method using a dispersion medium such as balls, beads, or the like to obtain secondary mixed and disintegrated slurry, and the high-pressure dispersion step of dispersing the secondary mixed and disintegrated slurry under a high pressure of about 100 kg/cm$^2$ or more to obtain disperse slurry.

The ceramic powder is mixed with the dispersion solvent containing no binder, and disintegrated by the medium-type dispersion method to obtain the primary mixed and disintegrated slurry, the binder is added the primary mixed and disintegrated slurry, and the resultant mixture is again mixed and disintegrated by the medium-type dispersion method to obtain the secondary mixed and disintegrated slurry, followed by dispersion under a high pressure of about 100 kg/cm$^2$ or more. In this case, the ceramic powder can uniformly be dispersed without excessive damage to the ceramic powder, thereby producing high-quality ceramic slurry.

In the method of producing ceramic slurry of the present invention, a binder solution obtained by mixing and stirring a solvent and the binder, and then dispersing the binder in the solvent under a high pressure of about 100 kg/cm$^2$ or more is used as the binder.

By using, as the binder, the binder solution obtained by mixing and stirring the solvent and the binder, and then dispersing the binder under a high pressure of about 100 kg/cm$^2$ or more, the occurrence of gel, which is caused in direct addition of the binder, can be prevented to further improve the dispersibility of the ceramic powder.

In the method of producing ceramic slurry of the present invention, a binder solution obtained by mixing and stirring the solvent and the binder to form a binder mixed solution, and then heating the binder mixed solution under reflux at 40 to 100° C. is used as the binder.

By using the binder solution obtained by mixing and stirring the solvent and the binder to form a binder mixed solution, and then heating the binder mixed solution under reflux at 40 to 100° C. as the binder, the binder can be added in a state in which the binder is securely dissolved (a state without aggregation of μm size), thereby further improving the dispersibility of the ceramic powder.

In the method of producing ceramic slurry of the present invention, the disperse slurry (final disperse slurry) has a viscosity of about 0.01 to 0.1 Pas. With the disperse slurry (final disperse slurry) having a viscosity of about 0.01 to 0.1 Pas, the ceramic slurry is suitable for use in the process for forming a ceramic green sheet, thereby making the present invention more effective.

In the method of producing ceramic slurry of the present invention, the medium-type dispersion method uses a ball mill or a bead mill.

By using the method using a ball mill or bead mill as the medium-type dispersion method, agglomerated ceramic particles can securely be disintegrated, making the present invention more effective.

A method of producing a green sheet of the present invention comprises forming ceramic slurry produced by the method of the present invention in a sheet on a predetermined substrate to form a ceramic green sheet having a thickness of about 0.1 to 10 μm. Since the ceramic slurry produced by the above-described method comprises the ceramic powder having an average particle diameter of about 0.01 to 1 μm and sufficiently dispersed in the dispersion solvent, a high-quality ceramic green sheet having a small thickness (about 0.1 to 10 μm) can securely be produced by forming the ceramic slurry in a sheet. It is possible to obtain a ceramic green sheet having excellent surface smoothness, a high density, high tensile strength, and uniformity in the distribution of resins such as the binder, the plasticizer, etc., and suitable for manufacturing a multilayer ceramic electronic part.

A method of producing a multilayer ceramic electronic part of the present invention comprises forming ceramic green sheets by using ceramic slurry produced by the method of the present invention, laminating a plurality of the ceramic green sheets together with base metal internal electrodes, cutting and burning the laminated product, and then forming external electrodes.

A plurality of the ceramic green sheets formed by using the ceramic slurry produced by the method of the present invention are laminated together with base metal internal electrodes, the laminated product is cut and burned, and the external electrodes are formed thereon to obtain a high-quality multilayer ceramic electronic part having desired properties and high reliability.

In a further aspect of the present invention, a method of producing ceramic slurry comprises passing mixed slurry containing a ceramic powder having an average particle diameter of about 0.01 to 1 μm and a dispersion solvent through a predetermined passage under high pressure at a flow rate which can apply a maximum shear stress of about 1000 Pa or more to the ceramic powder to disperse the ceramic powder in the mixed slurry.

Since the mixed slurry of the ceramic powder having an average particle diameter of about 0.01 to 1 μm and the dispersion solvent is passed through the predetermined passage under high pressure and conditions which can apply a maximum shear stress of about 1000 Pa or more to the ceramic powder, the shear stress necessary for dispersion can be applied to the ceramic powder during the passage of the mixed slurry through the predetermined passage with less damage to the ceramic powder, thereby efficiently dispersing the ceramic powder.

In the present invention, "the mixed slurry of the ceramic powder and the dispersion solvent" includes a state containing the binder, the dispersant, the plasticizer, the antistatic agent, etc. Namely, the present invention also exhibits a sufficient operating effect in a case in which the mixed slurry containing additives such as the binder, the dispersant, the plasticizer, the antistatic agent, etc. is dispersed. Therefore, the method of producing ceramic slurry of the present invention includes the case in which the mixed slurry containing these additives is dispersed.

Although the present invention is advantageously applied to the ceramic powder having an average particle diameter (an average particle diameter measured by an electron microscope) in the range of about 0.01 to 1 μm, the present invention can also be applied to ceramic powders having an average particle diameter beyond the range of about 0.01 to 1 μm.

In a further aspect of the present invention, a method of producing ceramic slurry comprises passing mixed slurry containing a ceramic powder having an average particle diameter of about 0.01 to 1 μm and a dispersion solvent through a predetermined passage under high pressure at a wall shear rate of about $10^6$ (1/s) or more to disperse the ceramic powder in the mixed slurry.

The wall shear rate in the passage of the mixed slurry through the predetermined passage is set to about $10^6$ (1/s) or more so that the ceramic powder can securely efficiently be dispersed with less damage to the ceramic powder during the passage of the mixed slurry through the predetermined passage.

The maximum shear stress and the wall shear rate have the following relation:

Maximum shear stress=Wall shear rate×Viscosity of slurry

In the method of producing ceramic slurry, the mixed slurry is passed through the passage under a pressure of about 100 kg/cm² or more.

By applying a pressure of about 100 kg/cm² or more, preferably about 300 kg/cm² or more, to the mixed slurry, the wall shear rate in the predetermined passage can be set to about $10^6$ (1/s) or more, or the maximum shear stress can be set to about 1000 (Pa) or more, thereby making the present invention effective.

In the method of producing ceramic slurry, the ratio (length/characteristic diameter) $R_{L/D}$ of length to characteristic diameter of the passage lies in the following range:

$30 \leq R_{L/D} \leq 1000$

The characteristic diameter represents the following according to the sectional shape perpendicular to the axial direction:

(a) the short side of a rectangular sectional shape;
(b) the diameter of a circular shape;
(c) the short diameter of an elliptical shape; and
(d) the average depth of a fluid (=4×passage sectional area/total wetted length) in other sectional shapes.

The ratio (length/characteristic diameter) $R_{L/D}$ of length to characteristic diameter of the passage is set in the range of $30 \leq R_{L/D} \leq 1000$ so that the ceramic powder in the mixed slurry can be dispersed during the passage under practical conditions, thereby making the present invention more effective.

The reason for setting the ratio in the above range is that with $R_{L/D}$ of less than about 30, the ratio of the entrance region for the ceramic particles is increased to fail to obtain the sufficient disintegrating effect, while with $R_{L/D}$ of over about 1000, a pressure loss becomes excessive for the disintegrating effect.

In the method of producing ceramic slurry of the present invention, the passage has a substantially linear portion having a predetermined length in which a bent portion having a bending angle of 100° or less, or a curved portion having a curvature radius of 3 mm or less is not formed on the upstream side and downstream side.

The substantially linear portion provided in the passage enables the ceramic powder to be securely dispersed by applying the maximum shear stress (about 1000 Pa or more) necessary for dispersing the ceramic powder. Since the substantially linear portion has neither a bent portion having a bending angle of 100° or less nor a curved portion having a curvature radius of 3 mm or less on the upstream side and downstream side thereof, the ceramic powder can be prevented from being greatly damaged by collision or impact force before and after the supply of slurry to the passage, thereby making the present invention more effective.

A method of producing a green sheet of the present invention comprises forming ceramic slurry produced by the method of the present invention in a sheet on a predetermined substrate to form a ceramic green sheet having a thickness of about 0.1 to 10 μm.

Since the ceramic slurry produced by the above-described method comprises the ceramic powder having an average particle diameter of about 0.01 to 1 μm and sufficiently dispersed in the dispersion solvent, a high-quality ceramic green sheet having a small thickness (about 0.1 to 10 μm) can securely be produced by forming the ceramic slurry in a sheet. It is possible to obtain a ceramic green sheet having excellent surface smoothness, a high density, high tensile strength, and uniformity in the distribution of resins such as the binder, the plasticizer, etc., and suitable for manufacturing a multilayer ceramic electronic part.

A method of producing a multilayer ceramic electronic part of the present invention comprises forming ceramic green sheets by using ceramic slurry produced by the method of the present invention, laminating a plurality of the ceramic green sheets together with base metal internal electrodes, cutting and burning the laminated product, and then forming external electrodes.

A plurality of the ceramic green sheets formed by using the ceramic slurry produced by the method of the present invention are laminated together with base metal internal electrodes, the laminated product is cut and burned, and the external electrodes are formed thereon to obtain a high-quality multilayer ceramic electronic part having desired properties and high reliability.

In a further aspect of the present invention, a method of producing ceramic slurry used for manufacturing a ceramic electronic part comprises the mixing disintegration step by an impact force-type high-pressure dispersion method in which a mixture of a ceramic powder having an average particle diameter of about 0.01 to 1 μm and a dispersion solvent is ejected under a pressure of about 100 kg/cm² to cause the mixture to collide with a solid wall made of a hard material at a velocity of about 100 m/s or more so that the ceramic powder is disintegrated to a desired state and dispersed to obtain mixed and disintegrated slurry, and the dispersion step by a shear stress-type high-pressure dispersion method in which the mixed and disintegrated slurry is passed through a predetermined passage under a high pressure of about 100 kg/cm² or more at a flow rate which can apply a maximum shear stress of about 1000 Pa or more or a wall shear rate of about $10^6$ (1/s) or more to the ceramic powder.

In a further aspect of the present invention, a method of producing ceramic slurry used for manufacturing a ceramic electronic part comprises the mixing disintegration step by an impact force-type high-pressure dispersion method in which a mixture of a ceramic powder having an average particle diameter of about 0.01 to 1 μm and a dispersion solvent is ejected under a pressure of about 100 kg/cm² from a plurality of opposite nozzles to cause the ceramic powder and the dispersion solvent to collide with each other at a velocity of about 50 m/s or more so that the ceramic powder is disintegrated to a desired state and dispersed to obtain mixed and disintegrated slurry, and the dispersion step by a shear stress-type high-pressure dispersion method in which the mixed and disintegrated slurry is passed through a predetermined passage under a high pressure of about 100 kg/cm² or more at a flow rate which can apply a maximum shear stress of about 1000 Pa or more or a wall shear rate of about $10^6$ (1/s) or more to the ceramic powder.

In the method of producing ceramic slurry of the present invention, the mixed and disintegrated slurry is obtained by the impact force-type high-pressure dispersion method in which the mixture of the ceramic powder having an average particle diameter of about 0.01 to 1 μm and the dispersion solvent is ejected from a small nozzle or orifice to cause the mixture to collide with the solid wall or the materials ejected from nozzles are caused to collide with each other. Then, the mixed and disintegrated slurry is dispersed by the shear stress-type high-pressure dispersion method comprising passing the slurry through the small passage at a high velocity, thereby obtaining disperse slurry in which the ceramic powder is sufficiently dispersed.

Namely, the ceramic powder is dispersed by a combination of the impact force-type high-pressure dispersion method and the shear stress-type high-pressure dispersion method to uniformly disperse the ceramic powder while suppressing deterioration in crystallinity of the ceramic powder and an excessive increase in the specific surface area, thereby obtaining high-quality ceramic slurry.

In the present invention, the dispersion solvent may contain the dispersant, the plasticizer, and the antistatic agent, and further contain other additives.

In the present invention, in mixing and disintegration by the impact force-type high-pressure dispersion method, various means (mechanisms) such as a small nozzle, an orifice having a nozzle having a predetermined diameter and the like, can be used as means for ejecting the mixture of the ceramic powder and the dispersion solvent under pressure.

In the present invention, mixing and disintegration may be performed by the impact force-type high-pressure dispersion method with the binder added to the mixture.

Even in the mixing disintegration step performed with the binder added to the mixture, the ceramic powder can uniformly be dispersed without excessive damage to the ceramic powder, thereby producing high-quality ceramic slurry.

The time of addition of the binder is not limited, and the binder may be previously mixed with the dispersion solvent or mixed therewith at the time the ceramic powder is dispersed in the dispersion solvent.

In a further aspect of the present invention, a method of producing ceramic slurry used for manufacturing a ceramic electronic part comprises the mixing disintegration step of mixing a ceramic powder having an average particle diameter of about 0.01 to 1 μm and a dispersion solvent containing no binder, and disintegrating the ceramic powder by the impact force-type high-pressure dispersion method to obtain mixed and disintegrated slurry, and the dispersion step of adding the binder to the mixed and disintegrated slurry and dispersing the resultant mixture by the shear stress-type high-pressure dispersion method.

The ceramic powder is mixed with the dispersion solvent containing no binder and disintegrated by the impact force-type high-pressure dispersion method to obtain the mixed and disintegrated slurry, and the binder is added to the mixed and disintegrated slurry, followed by dispersion by the shear stress-type high-pressure dispersion method to obtain disperse slurry in which the ceramic powder is further sufficiently dispersed.

Namely, the binder is partially gelled in the dispersion solvent in some cases, and thus the ceramic powder is mixed with the dispersion solvent and disintegrated by the impact force-type high-pressure dispersion method before the binder is added to improve the efficiency of mixing and disintegration, as compared with mixing and disintegration of the ceramic powder in a partially gelled state by the impact force-type high-pressure dispersion method. Therefore, the final dispersibility of the ceramic powder can be further improved.

In a further aspect of the present invention, a method of producing ceramic slurry used for manufacturing a ceramic electronic part comprises the mixing disintegration step of mixing a ceramic powder having an average particle diameter of about 0.01 to 1 μm and a dispersion solvent containing no binder and disintegrating the ceramic powder by the impact force-type high-pressure dispersion method to obtain mixed and disintegrated slurry, the primary dispersion step of dispersing the mixed and disintegrated slurry by the shear stress-type high-pressure dispersion method to obtain primary disperse slurry, and the secondary dispersion step of adding the binder to the primary disperse slurry and dispersing the resultant mixture by the shear stress-type high-pressure dispersion method to obtain secondary disperse slurry (final disperse slurry).

The ceramic powder is mixed with the dispersion solvent containing no binder and disintegrated by the impact force-type high-pressure dispersion method to obtain the mixed and disintegrated slurry, and the mixed and disintegrated slurry is dispersed by the shear stress-type high-pressure dispersion method to obtain the primary disperse slurry. Then, the binder is added to the primary disperse slurry, and the resultant mixture is further dispersed by the shear stress-type high-pressure dispersion method. In this method, the ceramic powder can be uniformly dispersed without excessive damage to the ceramic powder to produce high-quality ceramic slurry.

In a further aspect of the present invention, a method of producing ceramic slurry used for manufacturing a ceramic electronic part comprises the primary mixing disintegration step of mixing a ceramic powder having an average particle diameter of about 0.01 to 1 μm and a dispersion solvent containing no binder and disintegrating the ceramic powder by the impact force-type high-pressure dispersion method to obtain primary mixed and disintegrated slurry, the secondary mixing disintegration step of adding the binder to the primary mixed and disintegrated slurry and mixing and disintegrating the resultant mixture by the impact force-type high-pressure dispersion method to obtain secondary mixed and disintegrated slurry, and the dispersion step of dispersing the secondary mixed and disintegrated slurry by the shear stress-type high-pressure dispersion method to obtain disperse slurry.

The ceramic powder is mixed with the dispersion solvent containing no binder and disintegrated by the impact force-type high-pressure dispersion method to obtain the primary mixed and disintegrated slurry, and the binder is added the primary mixed and disintegrated slurry, followed by further mixing and disintegration by the impact force-type high-pressure dispersion method to obtain the secondary mixed and disintegrated slurry. Then, the secondary mixed and disintegrated slurry is dispersed by the shear stress-type high-pressure dispersion method. In this method, the ceramic powder can be uniformly dispersed without excessive damage to the ceramic powder to produce high-quality ceramic slurry.

The method of producing ceramic slurry of the present invention uses, as the binder, a binder solution obtained by mixing and stirring the solvent and the binder, and then dispersing the mixture by the shear stress-type high-pressure dispersion method comprising passing the mixture through a predetermined passage under a high pressure of about 100 kg/cm$^2$ or more at a flow rate which can apply a maximum shear stress of about 1000 Pa or more or a wall shear rate of about $10^6$ (1/s) or more.

By using the binder solution obtained by mixing and stirring the solvent and the binder, and then dispersing the mixture by the shear stress-type high-pressure dispersion method as the binder, the occurrence of gel, which is caused in direct addition of the binder, can be prevented to further improve the dispersibility of the ceramic powder.

The method of producing ceramic slurry of the present invention uses, as the binder, a binder solution obtained by mixing and stirring the solvent and the binder to form a binder mixed solution, and then heating the binder mixed solution under reflux at 40 to 100° C. By using the binder solution obtained by mixing and stirring the solvent and the binder to form the binder mixed solution, and then heating the binder mixed solution under reflux at 40 to 100° C. as the binder, the binder can be added in a state in which the binder is securely dissolved (a state without aggregation of $\mu$m size), thereby further improving the dispersibility of the ceramic powder.

In the method of producing ceramic slurry of the present invention, the disperse slurry (final disperse slurry) has a viscosity of about 0.003 to 0.1 Pas. With the disperse slurry (final disperse slurry) having a viscosity of about 0.003 to 0.1 Pas, the ceramic slurry is suitable for use in the process for forming a ceramic green sheet, thereby making the present invention more effective.

A method of producing a green sheet of the present invention comprises forming ceramic slurry produced by the method of the present invention in a sheet on a predetermined substrate to form a ceramic green sheet having a thickness of about 0.1 to 10 $\mu$m.

Since the ceramic slurry produced by the above-described method comprises the ceramic powder having an average particle diameter of about 0.01 to 1 $\mu$m and sufficiently dispersed in the dispersion solvent, a high-quality ceramic green sheet having a small thickness (about 0.1 to 10 $\mu$m) can securely be produced by forming the ceramic slurry into a sheet. Namely, it is possible to obtain a ceramic green sheet having excellent surface smoothness, a high density, high tensile strength, and uniformity in the distribution of resins such as the binder, the plasticizer, etc., and suitable for manufacturing a multilayer ceramic electronic part.

A method of producing a multilayer ceramic electronic part of the present invention comprises forming ceramic green sheets by using ceramic slurry produced by the method of the present invention, laminating a plurality of the ceramic green sheets together with base metal internal electrodes, cutting and burning the laminated product, and then forming external electrodes.

A plurality of the ceramic green sheets formed by using the ceramic slurry produced by the method of the present invention are laminated together with base metal internal electrodes, the laminated product is cut and burned, and the external electrodes are formed thereon to obtain a high-quality multilayer ceramic electronic part having desired properties and high reliability.

In a further aspect of the present invention, a method of producing a ceramic slurry composition containing a ceramic powder, a dispersant, a binder, and a solvent comprises mixing, at a predetermined ratio, at least (a) a ceramic powder, (b) a dispersant, and (c) a binder solution obtained by mixing a binder and a solvent to form a solution and dispersing the binder in the solution under a high pressure of about 100 kg/cm$^2$ or more, and then dispersing the resultant mixture.

The solvent and the binder are previously mixed to form a solution, and the binder is dispersed in the under a high pressure of about 100 kg/cm$^2$ or more to efficiently dissolve the binder in the solvent. The thus-obtained binder solution is mixed with the ceramic powder, and the dispersant at the predetermined ratio, and the mixture is dispersed to efficiently produce a ceramic slurry composition containing less undissolved binder. By using the ceramic slurry composition of the present invention, the ceramic green sheet having less defects can be efficiently produced.

The method of producing a ceramic slurry composition of the present invention uses as the binder a binder solution prepared by mixing the solvent and the binder to form a solution, dispersing the binder in the solution under a high pressure of about 100 kg/cm$^2$ or more, and then filtering the solution. Since the viscosity of the binder is decreased by high-pressure dispersion, filtration with a filter having a small pore size can easily be carried out, thereby effectively removing the undissolved material. It is thus possible to securely produce ceramic slurry from which the undissolved material is precisely removed, thereby making the present invention more effective.

In a further aspect of the present invention, a ceramic slurry composition comprises at least a ceramic powder, a dispersant, a binder, and a solvent wherein a binder solution obtained by mixing a binder and a solvent to form a solution and dispersing the binder in the solution under a high pressure of about 100 kg/cm$^2$ or more is used as the binder.

The solvent and the binder are previously mixed to form a solution, and the binder is dispersed in the solution under a high pressure of about 100 kg/cm$^2$ or more to form the binder solution having excellent solubility of the binder, thereby obtaining ceramic slurry containing less undissolved binder. By using the ceramic slurry composition of the present invention, a ceramic green sheet having less defects can be efficiently produced.

In the present invention, the binder used may contain a plasticizer, and an antistatic agent, and further contain other additives.

In the present invention, the method of dispersing the ceramic powder, the dispersant, and the binder is not limited, and various dispersion methods such as a method using a medium-type dispersing machine such as a bead mill, a ball mill, an attritor, a pan shaker, a sand mill, or the like, a kneading method, a three-roll method, a high-pressure dispersion method, etc. can be used.

In the stage of the ceramic powder or the mixture of the ceramic powder and the dispersion solvent, the ceramic powder may be previously dispersed by using any one of the above various methods.

In preparing the ceramic slurry composition, the order of addition of the dispersant, the binder, etc. is not limited, but a preferred method comprises mixing the ceramic powder, the dispersant, and the solvent, adsorbing the dispersant on the ceramic powder by dispersion, and then adding the binder to the mixture, followed by further mixing and dispersion.

The ceramic slurry composition contains as the binder a binder solution prepared by mixing the solvent and the binder to form a solution, dispersing the binder in the solvent under a high pressure of about 100 kg/cm$^2$ or more, and then filtering the solution.

Since the viscosity is decreased by dispersing the binder under high pressure to facilitate filtration with a filter having a small pore size, and thus the undissolved material can efficiently be removed to obtain ceramic slurry from which the undissolved material is precisely removed.

The ceramic slurry composition of the present invention comprises the ceramic powder having an average particle diameter of about 0.01 to 1 μm.

The present invention is particularly useful for application to a ceramic slurry composition comprising a fine ceramic powder having an average particle diameter of about 0.01 to 1 μm and used for producing a thin ceramic green sheet. By using the ceramic slurry composition comprising the ceramic powder having an average particle diameter of about 0.01 to 1 μm and the binder solution used as the binder and subjected to the above-described high-pressure dispersion treatment, a thin ceramic green sheet having less defects can be efficiently produced. However, the present invention can also be applied to cases in which the average particle diameter is beyond the range of about 0.01 to 1 μm.

A method of producing a ceramic green sheet of the present invention comprises forming the ceramic slurry composition of the present invention in a sheet on a predetermined substrate.

Since the ceramic slurry composition of the present invention contains less dissolved binder or substantially no dissolved binder, the ceramic slurry composition can be formed in a sheet to securely produce a high-quality thin ceramic green sheet having no defect. In producing a multilayer ceramic electronic part by using the ceramic green sheet, a high-quality multilayer ceramic electronic part having high reliability and desired properties can be obtained.

In the method of producing a ceramic green sheet of the present invention, the ceramic green sheet has a thickness of about 0.1 to 10 μm.

Even with a small thickness (thickness=about 0.1 to 10 μm), the method of the present invention can securely produce a high-quality ceramic green sheet suitable for use for manufacturing a multilayer ceramic electronic part.

A method of manufacturing a multilayer ceramic electronic part of the present invention comprises laminating a plurality of ceramic green sheets produced by the method of the present invention, cutting and burning the laminated product, and then forming external electrodes thereon.

The method comprising laminating a plurality of the ceramic green sheets produced by the method of the present invention, cutting and burning the laminated product, and then forming the external electrodes thereon can efficiently produce a multilayer ceramic electronic part having a low rate of short circuit and high reliability because of the use of the ceramic green sheets having less defects.

DESCRIPTION OF THE PREFERRED EMBODIMENTS

Figure 1:
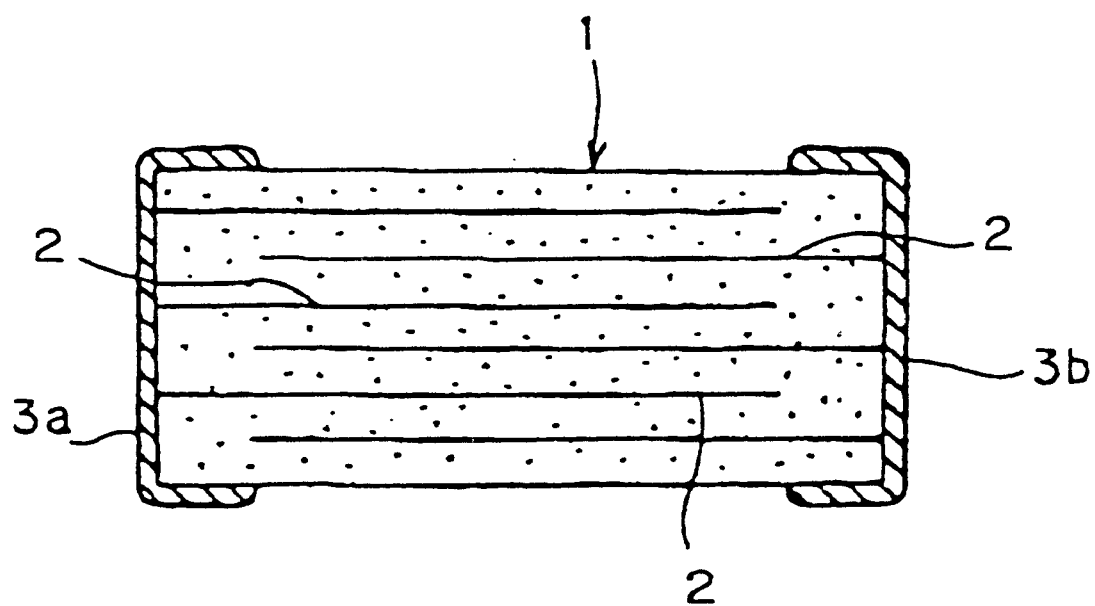
FIG. 1 is a sectional view showing the structure of a monolithic ceramic capacitor produced by laminating ceramic green sheets.

The present invention is described in further detail below with reference to embodiments.

In carrying out the present invention, the type and composition of a ceramic powder are not limited, and various ceramic powders such as dielectric ceramic powders of barium titanate, strontium titanate, lead titanate and the like, magnetic ceramic powders of ferrite and the like, piezoelectric ceramic powders, insulator ceramic powders of alumina, silica and the like can be used for ceramic slurry.

With respect to the particle diameter of the ceramic powder, any particle diameter can basically be used without problems as long as the ceramic powder can be passed through a high-pressure dispersion apparatus. However, the present invention exhibits a greatest effect in application to a ceramic powder having an average particle diameter of about 0.01 to 1 μm determined by an electron microscope, which causes difficulties in dispersion by a conventional dispersion method.

The ceramic powder may contain additives and impurities. For example, in the ceramic powder containing barium titanate as a main component, the ceramic powder may contain glass, magnesium oxide, manganese oxide, barium oxide, rare earth oxide and calcium oxide components as additives.

Also, in the present invention, the type of a dispersion solvent (solvent) is not limited, and for example, aromatic solvents such as toluene, xylene and the like, and alcoholic solvents such as ethyl alcohol, isopropyl alcohol, butyl alcohol, and the like can be used. These solvents may be used independently or in a mixture. As the dispersion solvent, other organic solvents, and water can also be used.

Preferred examples of dispersants which can be used in the present invention include anionic dispersants such as carboxylates, sulfonates, phosphates and the like. Carboxylic acid type dispersants containing no metal ion are more preferably used. The type of the dispersant is not limited, and other various dispersants can also be used.

As a binder, polyvinyl butyral resins, cellulose resins, acrylic resins, vinyl acetate resins and the like can be used. The type and amount of the binder are appropriately selected according to the intended ceramic green sheet.

As a plasticizer, various plasticizers such as polyethylene glycol, phthalates, and the like can be used. The type and amount of the plasticizer are appropriately selected according to the intended ceramic green sheet.

The present invention is described in further detail below with reference to examples.

EXAMPLE 1

(1) 100 parts by weight of commercial dielectric material (in this example, a barium titanate ceramic powder) having a particle diameter of 0.2 $\mu$m was mixed with 2 parts by weight of anionic dispersant, 80 parts by weight of 10 weight % solution of acrylic resin binder, 1.4 parts by weight of dioctyl phthalate (referred to as "DOP" hereinafter) serving as plasticizer, and 50 parts by weight each of toluene and ethanol as dispersion solvents (solvent), and 500 parts by weight of zirconia balls having a diameter of 2 mm were added to the resultant mixture.

(2) Next, the thus-obtained mixed slurry was mixed and disintegrated by a ball mill for 5 hours.

(3) Then, the mixed and disintegrated slurry obtained by mixing and disintegration by the ball mill was processed 20 times under a pressure of 1300 kg/cm$^2$ by a high-pressure dispersion apparatus at a throughput of 300 cc/min to obtain disperse slurry (final disperse slurry) for producing ceramic green sheets. The dispersibility of the thus-obtained disperse slurry was evaluated by a particle size distribution measurement apparatus produced by Micro Track Co., Ltd. As a result, the particle size distribution had an integrated 90% diameter (D90) of 0.45 $\mu$m.

The disperse slurry was dried, and heated to 500° C. to remove the binder, and then the specific surface area was measured. The rate of increase in the specific surface area was 8% based on the initial specific surface area.

Next, the disperse slurry was formed in a sheet by the doctor blade method to form a ceramic green sheet.

The surface roughness (Ra) of the thus-formed ceramic green sheet was measured by an atomic force microscope, and the ratio (measured density/theoretical density) of measured density to theoretical density was determined as the density ratio of the ceramic green sheet. Ra was 60 nm, and the density ratio was 1.00.

Next, by using the ceramic green sheet, a monolithic ceramic capacitor having a structure was produced, in which the internal electrodes 2 were provided in the ceramic element 1, and a pair of the external electrodes 3a and 3b were provided at both ends of the ceramic element 1 so as to be connected to the internal electrodes 2 which alternately ended at different side ends, as shown in FIG. 1.

The monolithic ceramic capacitor was manufactured by the following method:

(1) First, Ni paste was coated on each of the ceramic green sheets produced as described above by screen printing to form a sheet provided with an electrode, on which a capacity forming internal electrode was provided.

Figure 2:
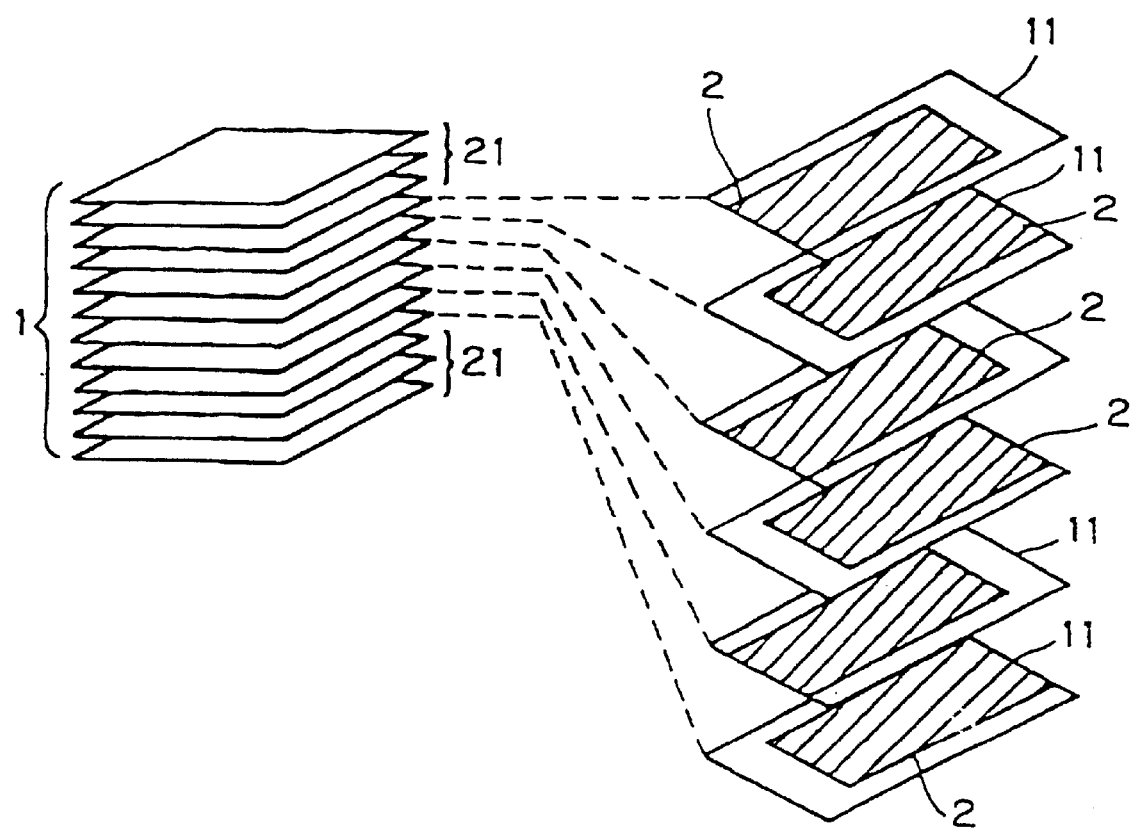
FIG. 2 is a drawing showing a method of manufacturing a monolithic ceramic capacitor.

Next, as shown in FIG. 2, a predetermined number (in this example, 70 layers) of sheets 11 provided with electrodes were laminated, and ceramic green sheets (outer layer sheets) 21 provided with no electrode were laminated on upper and lower sides of the laminated sheets, followed by compression. As a result, a laminated product (laminated compressed product) was formed, in which the ends of the internal electrodes 2 were alternately led to the different side ends.

(3) Then, the laminated compressed product was cut in a predetermined size by a dicer, and binder removal and burning were carried out.

The binder removal was carried out by heat treatment in a nitrogen atmosphere.

The burning was carried out by heating to a predetermined temperature in a weakly reducing atmosphere.

(4) Then, a conductive paste comprising silver as a conductive component was coated at both ends of the burned laminated product (ceramic element) 1, and then baked to form the external electrodes 3a and 3b (FIG. 1) connected to the internal electrodes 2.

As a result, a monolithic ceramic capacitor comprising the Ni internal electrodes 2 as shown in FIG. 1 was obtained.

As a result of measurement of the short-circuit rate (occurrence rate of short circuit) of the monolithic ceramic capacitor produced as described above, a good short-circuit rate of 3.0% was obtained. The temperature characteristics of capacitance satisfied X7R.

EXAMPLE 2

(1) First, 100 parts by weight of commercial dielectric material (in this example, a barium titanate ceramic powder) having a particle diameter of 0.2 $\mu$m was mixed with 2 parts by weight of anionic dispersant, and 35 parts by weight each of toluene and ethanol, and 500 parts by weight of zirconia balls having a diameter of 2 mm were added to the resultant mixture.

(2) Next, the thus-obtained mixed slurry was mixed and disintegrated in a ball mill for 5 hours.

(3) Then, the mixed and disintegrated slurry obtained by mixing and disintegration by the ball mill was taken out, and a binder solution was added to the slurry. The binder solution was previously prepared by mixing and stirring 10 parts by weight of acrylic resin binder, 1.4 parts by weight of DOP as a plasticizer and 35 parts by weight each of toluene and ethanol as solvents to form a solution.

(4) The resultant mixture was processed 15 times under a pressure of 1300 kg/cm$^2$ by the high-pressure dispersion apparatus a throughput of 300 cc/min to obtain disperse slurry (final disperse slurry) for producing ceramic green sheets.

The dispersibility of the thus-obtained disperse slurry was evaluated by the particle size distribution measurement apparatus produced by Micro Track Co., Ltd. The particle size distribution had D90 of 0.45 $\mu$m.

The disperse slurry was dried, and heated to 500° C. to remove the binder, and then the specific surface area was measured. The rate of increase in the specific surface area was 8% based on the initial specific surface area.

Next, the disperse slurry was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 60 nm, and the density ratio was 1.00.

Next, by using the ceramic green sheet, a monolithic ceramic capacitor was produced.

Since the monolithic ceramic capacitor was produced by the same method as Example 1, the description thereof is omitted for avoiding duplication.

As a result of measurement of the short-circuit rate of the produced monolithic ceramic capacitor, a good short-circuit rate of 3.0% was obtained. The temperature characteristics of capacitance satisfied X7R.

EXAMPLE 3

(1) First, 100 parts by weight of commercial dielectric material (in this example, a barium titanate ceramic powder) having a particle diameter of 0.2 $\mu$m was mixed with 2 parts by weight of anionic dispersant, and 35 parts by weight each of toluene and ethanol, and 500 parts by weight of zirconia balls having a diameter of 2 mm were added to the resultant mixture.

(2) Next, the thus-obtained mixed slurry was mixed and disintegrated in a ball mill for 5 hours.

(3) Then, the mixed and disintegrated slurry obtained by mixing and disintegration by the ball mill was taken out, and processed 10 times under a pressure of 1300 kg/cm$^2$ by the high-pressure dispersion apparatus at a throughput of 300 cc/min to obtain disperse slurry (primary disperse slurry).

(4) Then, a binder solution was added to the primary disperse slurry. The binder solution was previously prepared by mixing and stirring 10 parts by weight of acrylic resin binder, 1.4 parts by weight of DOP as a plasticizer and 35 parts by weight each of toluene and ethanol as solvents to form a solution (5) The resultant mixture was further processed 5 times under a pressure of 1300 kg/cm$^2$ by the high-pressure dispersion apparatus at a throughput of 300 cc/min to obtain secondary disperse slurry (final disperse slurry) for producing ceramic green sheets.

The dispersibility of the thus-obtained final disperse slurry was evaluated by the particle size distribution measurement apparatus produced by Micro Track Co., Ltd. The particle size distribution had D90 of 0.42 $\mu$m.

The final disperse slurry was dried, and heated to 500° C. to remove the binder, and then the specific surface area was measured. The rate of increase in the specific surface area was 8% based on the initial specific surface area.

Next, the disperse slurry was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. As a result, Ra was 55 nm, and the density ratio was 1.00.

Next, by using the ceramic green sheet, a monolithic ceramic capacitor was produced.

Since the monolithic ceramic capacitor was produced by the same method as Example 1, the description thereof is omitted for avoiding duplication.

As a result of measurement of the short-circuit rate of the produced monolithic ceramic capacitor, a good short-circuit rate of 3.0% was obtained. The temperature characteristics of capacitance satisfied X7R.

EXAMPLE 4

(1) First, 100 parts by weight of commercial dielectric material (in this example, a barium titanate ceramic powder) having a particle diameter of 0.2 $\mu$m was mixed with 2 parts by weight of anionic dispersant and 35 parts by weight each of toluene and ethanol, and 500 parts by weight of zirconia balls having a diameter of 2 mm were added to the resultant mixture.

(2) Next, the thus-obtained mixed slurry was mixed and disintegrated in a ball mill for 5 hours.

(3) Then, the mixed and disintegrated slurry obtained by mixing and disintegration by the ball mill was taken out, and processed 10 times under a pressure of 1300 kg/cm$^2$ by the high-pressure dispersion apparatus at a throughput of 300 cc/min to obtain disperse slurry (primary disperse slurry).

(4) Then, a binder solution was added to the primary disperse slurry. The binder solution was previously prepared by mixing and stirring 10 parts by weight of acrylic resin binder, 1.4 parts by weight of DOP as a plasticizer and 35 parts by weight each of toluene and ethanol as solvents to form a solution, and then heating the solution under reflux at 65° C. for 5 hours.

(5) The resultant mixture was further processed 5 times under a pressure of 1300 kg/cm$^2$ by the high-pressure dispersion apparatus at a throughput of 300 cc/min to obtain secondary disperse slurry (final disperse slurry) for producing ceramic green sheets.

The dispersibility of the thus-obtained final disperse slurry was evaluated by the particle size distribution measurement apparatus produced by Micro Track Co., Ltd. The particle size distribution had D90 of 0.42 $\mu$m.

The final disperse slurry was dried, and heated to 500° C. to remove the binder, and then the specific surface area was measured. The rate of increase in the specific surface area was 8% based on the initial specific surface area.

Next, the disperse slurry was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 55 nm, and the density ratio was 1.00.

Next, by using the ceramic green sheet, a monolithic ceramic capacitor was produced.

Since the monolithic ceramic capacitor was produced by the same method as Example 1, the description thereof is omitted for avoiding duplication.

As a result of measurement of the short-circuit rate of the produced monolithic ceramic capacitor, a good short-circuit rate of 1.5% was obtained. The temperature characteristics of capacitance satisfied X7R.

EXAMPLE 5

(1) First, 100 parts by weight of commercial dielectric material (in this example, a barium titanate ceramic powder) having a particle diameter of 0.2 $\mu$m was mixed with 2 parts by weight of anionic dispersant and 35 parts by weight each of toluene and ethanol, and 500 parts by weight of zirconia balls having a diameter of 2 mm were added to the resultant mixture.

(2) Next, the thus-obtained mixed slurry was mixed and disintegrated in a ball mill for 5 hours.

(3) Then, the mixed and disintegrated slurry obtained by mixing and disintegration by the ball mill was taken out, and processed 10 times under a pressure of 1300 kg/cm$^2$ by the high-pressure dispersion apparatus at a throughput of 300 cc/min to obtain disperse slurry (primary disperse slurry).

(4) Then, a binder solution was added to the primary disperse slurry. The binder solution was previously prepared by mixing and stirring 10 parts by weight of acrylic resin binder, 1.4 parts by weight of DOP as a plasticizer and 35 parts by weight each of toluene and ethanol as solvents to form a solution, and then processing 5 times the solution under a pressure of 1300 kg/cm$^2$ by the high-pressure dispersion apparatus at a throughput of 300 cc/min.

(5) The resultant mixture was further processed 5 times under a pressure of 1300 kg/cm$^2$ by the high-pressure dispersion apparatus at a throughput of 300 cc/min to obtain secondary disperse slurry (final disperse slurry) for producing ceramic green sheets.

The dispersibility of the thus-obtained final disperse slurry was evaluated by the particle size distribution measurement apparatus produced by Micro Track Co., Ltd. The particle size distribution had D90 of 0.42 μm.

The final disperse slurry was dried, and heated to 500° C. to remove the binder, and then the specific surface area was measured. The rate of increase in the specific surface area was 8% based on the initial specific surface area.

Next, the disperse slurry was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 55 nm, and the density ratio was 1.00.

Next, by using the ceramic green sheet, a monolithic ceramic capacitor was produced.

Since the monolithic ceramic capacitor was produced by the same method as Example 1, the description thereof is omitted for avoiding duplication.

As a result of measurement of the short-circuit rate of the produced monolithic ceramic capacitor, a good short-circuit rate of 0.5% was obtained. The temperature characteristics of capacitance satisfied X7R.

EXAMPLE 6

Disperse slurry was produced under the same conditions as Example 1 except that polyvinyl butyral was used as the binder, and a ceramic green sheet was produced by using the thus-produced disperse slurry.

The dispersibility of the disperse slurry produced in this example was evaluated by the particle size distribution measurement apparatus produced by Micro Track Co., Ltd. The particle size distribution had D90 of 0.45 μm.

The disperse slurry was dried, and heated to 500° C. to remove the binder, and then the specific surface area was measured. The rate of increase in the specific surface area was 8% based on the initial specific surface area.

Next, the disperse slurry of this example was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 60 nm, and the density ratio was 1.00.

Next, by using the ceramic green sheet, a monolithic ceramic capacitor was produced.

Since the monolithic ceramic capacitor was produced by the same method as Example 1, the description thereof is omitted for avoiding duplication.

As a result of measurement of the short-circuit rate of the produced monolithic ceramic capacitor, a good short-circuit rate of 3.0% was obtained. The temperature characteristics of capacitance satisfied X7R.

COMPARATIVE EXAMPLE 1

Disperse slurry was produced under the same conditions as Example 1 except that the high-pressure dispersion apparatus used in Examples 1 to 6 was changed to a sand mill, and a ceramic green sheet was produced by using the thus-produced disperse slurry.

The dispersibility of the disperse slurry produced in this comparative example was evaluated by the particle size distribution measurement apparatus produced by Micro Track Co., Ltd. The particle size distribution had D90 of 0.60 μm.

The disperse slurry was dried, and heated to 500° C. to remove the binder, and then the specific surface area was measured. The rate of increase in the specific surface area was 30% based on the initial specific surface area.

Next, the disperse slurry of this example was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 110 nm, and the density ratio was 0.80.

Next, by using the ceramic green sheet, a monolithic ceramic capacitor was produced by the same method as Example 1.

As a result of measurement of the short-circuit rate of the thus-obtained monolithic ceramic capacitor, the short-circuit rate was as high as 50%. The temperature characteristics of capacitance did not satisfy X7R.

COMPARATIVE EXAMPLE 2

Disperse slurry was produced under the same conditions as Example 1 except that slurry was dispersed under a pressure of 50 kg/cm$^2$ by the high-pressure dispersion apparatus in place of 1300 kg/cm$^2$, and a ceramic green sheet was produced by using the thus-produced disperse slurry.

The dispersibility of the disperse slurry produced in this comparative example was evaluated by the particle size distribution measurement apparatus produced by Micro Track Co., Ltd. The particle size distribution had D90 of 0.60 μm.

The disperse slurry was dried, and heated to 500° C. to remove the binder, and then the specific surface area was measured. The rate of increase in the specific surface area was 7% based on the initial specific surface area.

Next, the disperse slurry of this example was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 110 nm, and the density ratio was 0.80.

Next, by using the ceramic green sheet, a monolithic ceramic capacitor was produced by the same method as Example 1.

As a result of measurement of the short-circuit rate of the thus-obtained monolithic ceramic capacitor, the short-circuit rate was as high as 45%. The temperature characteristics of capacitance satisfied X7R.

The dispersibility of the disperse slurry (final disperse slurry) obtained in each of Examples 1 to 6 and Comparative Examples 1 and 2, the specific surface area after binder removal, the surface roughness and density ratio of each of the produced ceramic green sheets, and the short-circuit rate and the temperature characteristics of capacitance of each of the monolithic ceramic capacitors are summarized in Table 1.

density and excellent surface smoothness. Therefore, in manufacturing a multilayer ceramic electronic part by using the ceramic green sheet, the short-circuit rate can be decreased to increase reliability. Furthermore, the ceramic powder is less damaged, thereby improving the reliability of the desired property.

Figure 3:
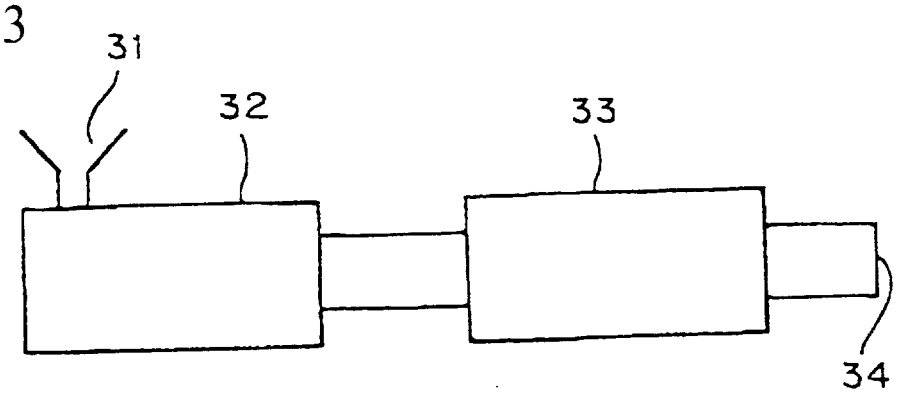
FIG. 3 is a drawing schematically showing the construction of a high-pressure dispersion apparatus used for carrying out a method of producing ceramic slurry of the present invention.

FIG. 3 is a drawing showing the schematic construction of a high-pressure dispersion apparatus used for carrying the method of producing ceramic slurry of the present invention.

The high-pressure dispersion apparatus comprises a raw material input unit 31 for inputting raw materials, a pressure unit 32 for applying pressure to the input raw materials, a

TABLE 1

|  | Dispersibility (D90 (μm)) | Rate of increase in specific surface area (%) | Surface roughness of sheet (Ra(nm)) | Density ratio of sheet (measured density/theoretical density) | Short-circuit rate (%) | Temperature characteristics of capacitance |
|---|---|---|---|---|---|---|
| Example 1 | 0.45 | 8 | 60 | 1.00 | 3.0 | X7R |
| Example 2 | 0.45 | 8 | 60 | 1.00 | 3.0 | X7R |
| Example 3 | 0.42 | 8 | 55 | 1.00 | 3.0 | X7R |
| Example 4 | 0.42 | 8 | 55 | 1.00 | 1.5 | X7R |
| Example 5 | 0.42 | 8 | 55 | 1.00 | 0.5 | X7R |
| Example 6 | 0.45 | 8 | 60 | 1.00 | 3.0 | X7R |
| Comparative Example 1 | 0.60 | 30 | 110 | 0.80 | 50 | B |
| Comparative Example 2 | 0.60 | 7 | 110 | 0.80 | 45 | X7R |

The present invention is not limited to the above-described examples, and in the scope of the gist of the invention, various applications and modifications can be made with respect to the types of a ceramic powder and a dispersion solvent, the type of the medium-type dispersion method, the construction of the high-pressure dispersion apparatus used for high-pressure dispersion, the types and adding amounts of additives such as a dispersant, a plasticizer, an antistatic agent, and the like, etc.

As described above, in the method of producing ceramic slurry of the present invention, a ceramic powder having an average particle diameter of about 0.01 to 1 μm is mixed with a dispersion solvent (solvent) and disintegrated by the medium-type dispersion method using a dispersion medium such as balls, beads, or the like to obtain mixed and disintegrated slurry, followed by high-pressure dispersion under a pressure of about 100 kg/cm$^2$ or more. Therefore, the ceramic powder is dispersed by a combination of the medium-type dispersion method and the high-pressure dispersion method, thereby suppressing deterioration in crystallinity of the ceramic powder and an excessive increase in the specific surface area, which are caused in dispersion only by the medium-type dispersion method. Also, unlike in dispersion only by the high-pressure dispersion method, insufficient disintegration of agglomerated particles can be suppressed to uniformly disperse the ceramic powder without excessive damage to the ceramic powder, thereby efficiently producing high-quality ceramic slurry.

Namely, the method of producing ceramic slurry of the present invention can efficiently disintegrate agglomerated particles by the medium-type dispersion method, permitting ideal dispersion design of slurry with avoiding excessive disintegration by high-pressure dispersion.

Also, a ceramic green sheet produced by using the ceramic slurry having good dispersibility exhibits a high dispersion unit (passage) 33 through which the input raw material (mixed slurry) is passed to disperse the material, and a discharge unit 34 for discharging disperse slurry dispersed by passing through the substantially linear dispersion unit (passage) 33.

Figure 4:
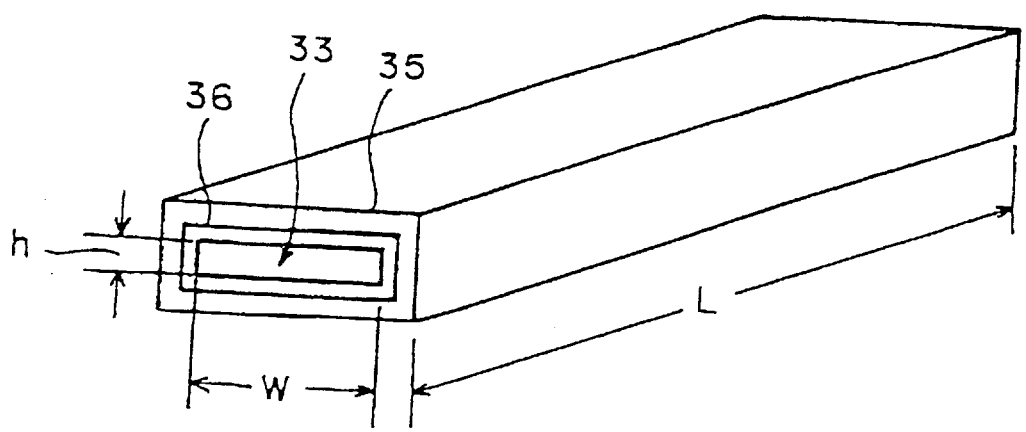
FIG. 4 is a perspective view showing a dispersing unit (passage) of a high-pressure dispersion apparatus used for carrying out a method of producing ceramic slurry of the present invention.

As shown in FIG. 4, the dispersion unit (passage) 33 of this high-pressure dispersion apparatus comprises a linear portion having a rectangular sectional shape in the direction perpendicular to the axial direction, and dimensions including a height H of 0.1 mm, a width W of 0.5 mm and a length L of 5 mm.

Figure 5:
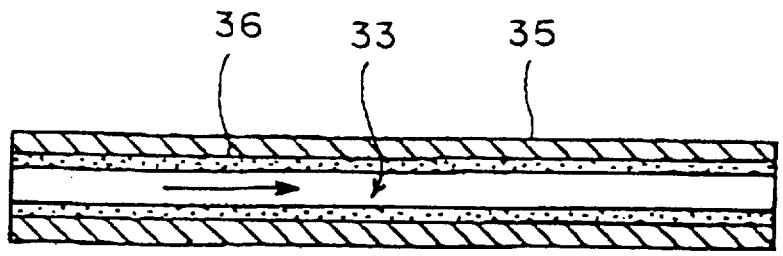
FIG. 5 is a sectional view of the dispersing unit (passage) of the high-pressure dispersion apparatus shown in FIG. 4.

The dispersion unit (passage) 33 has a structure in which a diamond layer 36 is provided on the inner periphery of a square cylinder (outer cylinder) 35 made of stainless steel in order to ensure abrasion resistance, as shown in FIG. 5.

Figure 6:
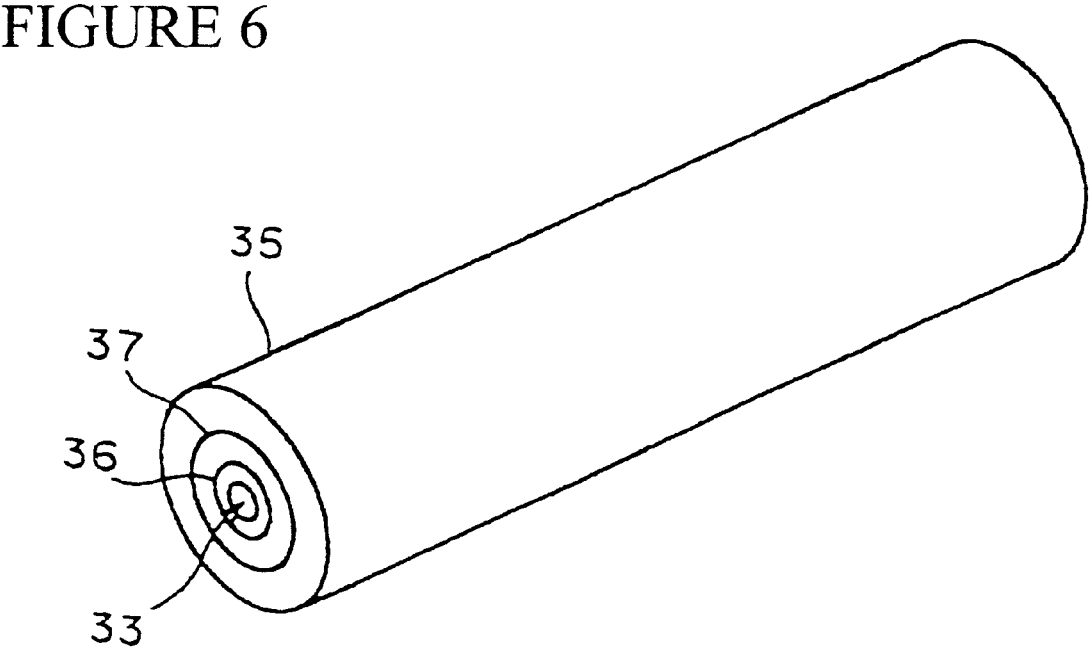
FIG. 6 is a perspective view showing another example of a dispersing unit (passage) of a high-pressure dispersion apparatus used for carrying out a method of producing ceramic slurry of the present invention.
Figure 7:
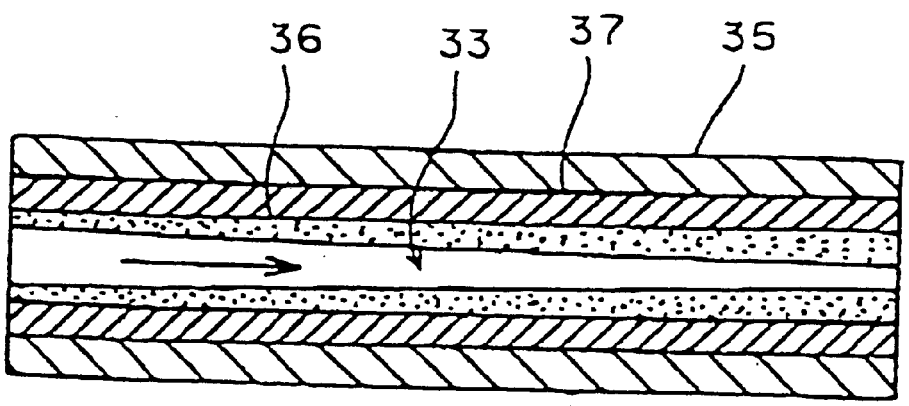
FIG. 7 is a sectional view of the dispersing unit (passage) of the high-pressure dispersion apparatus shown in FIG. 6.

FIGS. 6 and 7 show another example of a dispersion unit (passage), FIG. 6 being a perspective view, FIG. 7 being a sectional view. The dispersion unit (passage) 33 shown in FIGS. 6 and 7 has a circular sectional shape in the direction perpendicular to the axial direction, and a structure in which the inside is tapered so that the inner diameter decreases in the forward direction. The dispersion unit (passage) 33 also as a structure in which a tube 37 made of cemented carbide and comprising a diamond layer 36 formed on the inner periphery thereof is forced into a cylinder (outer cylinder) 35 made of stainless steel in order to ensure abrasion resistance, as shown in FIGS. 6 and 7. The thickness of the diamond layer 36 increases in the forward direction so that the inner diameter of the dispersion unit (passage) 33 decreases in the forward direction.

However, in the present invention, the shape and construction of the dispersion unit (passage) 33 of the high-pressure dispersion apparatus are not limited, and the sectional shape is not limited to the above-described rectangular shape, and circular shape. Various sectional shapes such as a square, a triangle, an ellipse, and a combination thereof can be used.

The length of the dispersion unit (passage) 33 is preferably set in a range in which the ratio (length/characteristic diameter) $R_{L/D}$ of length to characteristic diameter of the passage satisfies the condition $30 \leq R_{L/D} \leq 1000$. As described above, this is because with $R_{L/D}$ or less than about 30, the ratio of the entrance region for the ceramic powder is increased to fail to obtain the sufficient disintegrating effect, while with $R_{L/D}$ of over about 1000, a pressure loss becomes excessive for the disintegrating effect.

As described above, the dispersion unit (passage) 33 of the high-pressure dispersion apparatus of this embodiment comprises the substantially linear portion having a rectangular or circular sectional shape, while a bent portion having a bending angle of 100° or less, or a curved portion having a radius of curvature of 3 mm or less is not formed on the upstream side and downstream side of the linear portion. Therefore, the ceramic powder is less damaged by collision or impact force before and after slurry is supplied to the dispersion unit (passage) 33 to obtain high-quality disperse slurry.

In passage of the mixed slurry through the dispersion unit (passage) 33, the wall shear rate is preferably about $10^6$ (1/s) or more.

(1) In the passage having a rectangular sectional shape, the wall shear rate $\gamma$ is represented by the following equation:

$$\gamma = Q \times 6/h^2$$

wherein Q is a flow rate per unit width, and h is the height of the passage.

(2) In the passage having a circular sectional shape, the wall shear rate $\gamma$ is represented by the following equation:

$$\gamma = 4Q_V/\pi a^2$$

wherein $Q_v$ is a volume flow rate, and a is the radius of the passage.

The passage of the present invention which satisfies the above requirements produces a maximum shear stress of about 1000 Pa or more and/or a wall shear rate of about $10^6$ (1/s) or more in passage of the mixed slurry under the predetermined conditions. The shear stress and/or wall shear rate contributes to dispersion and disintegration of the ceramic powder.

The above-described materials (the ceramic powder, the dispersion solvent, the binder, the dispersant, the plasticizer, the antistatic agent, etc.) at a predetermined ratio are poured into a cup, an agitator, or the like, and preliminarily mixed therein to obtain mixed slurry. The thus-obtained mixed slurry is input through the input unit 31 of the high-pressure dispersion apparatus (FIG. 3), and pressurized to about 100 kg/cm² or more, preferably about 300 kg/cm² or more, in the pressure unit 32. The pressurized slurry is dispersed by great shear stress produced in high-speed flow through the dispersion unit (passage) 33. The resultant disperse slurry is discharged from the discharge unit 34.

EXAMPLE 7

(1) First, 100 parts by weight of commercial dielectric material (in this example, a barium titanate ceramic powder) having a particle diameter of 0.2 μm was mixed with 2 parts by weight of anionic dispersant, 10 parts by weight of acrylic resin binder and 100 parts by weight of toluene to form mixed slurry.

(2) Next, the thus-obtained mixed slurry was processed 10 times by the high-pressure dispersion apparatus shown in FIG. 3 at a flow rate controlled so that the wall shear rate was $10^6$ (1/s) to obtain disperse slurry.

The dispersibility of the thus-obtained disperse slurry was evaluated by the particle size distribution measurement apparatus produced by Micro Track Co., Ltd. It was confirmed that the integrated 90% diameter (D90) of the particle size distribution before high-pressure dispersion was 32 μm, while D90 after high-pressure dispersion was 0.45 μm.

The disperse slurry was dried at 500° C., and then the specific surface area was measured. The rate of increase in the specific surface area was only 5% based on the initial specific surface area.

Next, the disperse slurry of this example was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 60 nm, and the density ratio was 1.00.

Next, by using the ceramic green sheet, a monolithic ceramic capacitor was produced in which the internal electrodes 2 were provided in the ceramic element 1, and a pair of the external electrodes 3a and 3b were provided at both ends of the ceramic element 1 so as to be connected to the internal electrodes 2 which were alternately led to the different side ends, as shown in FIG. 1.

The monolithic ceramic capacitor was produced by the same method as Example 1.

As a result of measurement of the short-circuit rate of the produced monolithic ceramic capacitor, the short-circuit rate was as low as 3.0%. The temperature characteristics of capacitance satisfied X7R.

EXAMPLE 8

(1) First, 100 parts by weight of commercial dielectric material (in this example, a barium titanate ceramic powder) having a particle diameter of 0.2 μm was mixed with 2 parts by weight of anionic dispersant and 100 parts by weight of toluene to form mixed slurry.

(2) Next, the thus-obtained mixed slurry was processed 10 times by the high-pressure dispersion apparatus shown in FIG. 3 at a flow rate controlled so that the wall shear stress was 1000 Pa to obtain disperse slurry.

The dispersibility of the thus-obtained disperse slurry was evaluated by the particle size distribution measurement apparatus produced by Micro Track Co., Ltd. It was confirmed that although the integrated 90% diameter (D90) of the particle size distribution before high-pressure dispersion was 32 μm, D90 after high-pressure dispersion was 0.47 μm.

The disperse slurry was dried at 500° C., and then the specific surface area was measured. The rate of increase in the specific surface area was only 4.5% based on the initial specific surface area.

Next, the disperse slurry of this example was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 63 nm, and the density ratio was 1.00.

Next, by using the ceramic green sheet, a monolithic ceramic capacitor was produced by the same method as Example 1.

As a result of measurement of the short-circuit rate of the produced monolithic ceramic capacitor, the short-circuit rate was as low as 3.3%. The temperature characteristics of capacitance satisfied X7R.

COMPARATIVE EXAMPLE 3

(1) First, 100 parts by weight of commercial dielectric material (in this example, a barium titanate ceramic powder) having a particle diameter of 0.2 μm was mixed with 2 parts by weight of anionic dispersant, 10 parts by weight of acrylic resin binder and 100 parts by weight of toluene to form mixed slurry.

(2) Next, the thus-obtained mixed slurry was processed by dispersion with the sand mill (amount of balls PSZ (diameter 1 mm) added: 1000 g, rotational speed: 1000 rpm, dispersion time: 2 hours) to obtain disperse slurry.

The dispersibility of the thus-obtained disperse slurry was evaluated by the particle size distribution measurement apparatus produced by Micro Track Co., Ltd. The integrated 90% diameter (D90) of the particle size distribution was 0.60 μm.

The disperse slurry was dried at 500° C., and then the specific surface area was measured. The rate of increase in the specific surface area was only 30% based on the initial specific surface area. This was possibly caused by the fact that the ceramic powder was ground by collision with the balls.

Next, the disperse slurry of this example was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 110 nm, and the density ratio was 0.80.

Next, by using the ceramic green sheet, a monolithic ceramic capacitor was produced by the same method as Example 1.

As a result of measurement of the short-circuit rate of the produced monolithic ceramic capacitor, the short-circuit rate was as high as 50%. The temperature characteristics of capacitance did not satisfy X7R.

COMPARATIVE EXAMPLE 4

(1) First, 100 parts by weight of commercial dielectric material (in this example, a barium titanate ceramic powder) having a particle diameter of 0.2 μm was mixed with 2 parts by weight of anionic dispersant and 100 parts by weight of toluene to form mixed slurry.

(2) Next, the thus-obtained mixed slurry was processed by dispersion with the sand mill (amount of balls PSZ (diameter 1 mm) added: 1000 g, rotational speed: 1000 rpm, dispersion time: 2 hours) to obtain disperse slurry.

The dispersibility of the thus-obtained disperse slurry was evaluated by the particle size distribution measurement apparatus produced by Micro Track Co., Ltd. The integrated 90% diameter (D90) of the particle size distribution was 0.57 μm.

The disperse slurry was dried at 500° C., and then the specific surface area was measured. The rate of increase in the specific surface area was 28% based on the initial specific surface area.

Next, the disperse slurry was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 110 nm, and the density ratio was 0.80.

Next, by using the ceramic green sheet, a monolithic ceramic capacitor was produced by the same method as Example 1.

As a result of measurement of the short-circuit rate of the produced monolithic ceramic capacitor, the short-circuit rate was as high as 45%. The temperature characteristics of capacitance satisfied X7R.

The present invention is not limited to the above-described examples, and in the scope of the gist of the invention, various applications and modifications can be made with respect to the types of the ceramic powder and the dispersion solvent, the types of additives, the construction of the high-pressure dispersion apparatus used for high-pressure dispersion, etc.

EXAMPLE 9

(1) First, 100 parts by weight of commercial dielectric material (in this example, a barium titanate ceramic powder) having a particle diameter of 0.2 μm was mixed with 2 parts by weight of anionic dispersant, 80 parts by weight of a solution of 10 wt % acrylic resin binder, 1.4 parts by weight of "DOP" as a phthalate plasticizer and 50 parts by weight each of toluene and ethanol as dispersion solvents (solvent) to form mixed slurry.

(2) Next, the thus-obtained mixed slurry was processed 2 times under a pressure of 1300 kg/cm$^2$ by the impact force-type high-pressure dispersion method at a throughput of 300 cc/min to obtain mixed and disintegrated slurry.

(3) The mixed and disintegrated slurry was processed 20 times under a pressure of 1300 kg/cm$^2$ by the shear stress-type high-pressure dispersion method at a throughput of 300 cc/min to obtain disperse slurry (final disperse slurry) for producing ceramic green sheets.

The conditions (20 times of processing under a pressure of 1300 kg/cm$^2$ at a throughput of 300 cc/min) for dispersion by the shear stress-type high-pressure dispersion method can apply a maximum shear stress of about 1000 Pa or more or a wall shear rate of about $10^6$ (1/s) or more to the ceramic powder during passage of the mixed and disintegrated slurry through the predetermined passage.

The dispersibility of the thus-obtained disperse slurry was evaluated by the particle size distribution measurement apparatus produced by Micro Track Co., Ltd. The integrated 90% diameter (D90) of the particle size distribution was 0.45 μm.

The disperse slurry was dried, and heated to 500° C. to remove the binder, and then the specific surface area was measured. The rate of increase in the specific surface area was only 8% based on the initial specific surface area.

Next, the disperse slurry of this example was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 60 nm, and the density ratio was 1.00.

Next, by using the ceramic green sheet, a monolithic ceramic capacitor was produced, in which the internal electrodes 2 were provided in the ceramic element 1, and a pair of the external electrodes 3a and 3b were provided at both ends of the ceramic element 1 so as to be connected to the internal electrodes 2 which were alternately led to different side ends, as shown in FIG. 1

The monolithic ceramic capacitor was produced by the same method as Example 1.

As a result of measurement of the short-circuit rate of the monolithic ceramic capacitor, the short-circuit rate was as low as 3.0%. The temperature characteristics of capacitance satisfied X7R.

EXAMPLE 10

(1) First, 100 parts by weight of commercial dielectric material (in this example, a barium titanate ceramic powder) having a particle diameter of 0.2 μm was mixed with 2 parts by weight of anionic dispersant, and 35 parts by weight each of toluene and ethanol to form mixed slurry.

(2) Next, the thus-obtained mixed slurry was processed 2 times under a pressure of 1300 kg/cm$^2$ by the impact force-type high-pressure dispersion method at a throughput of 300 cc/min to obtain mixed and disintegrated slurry.

(3) The mixed and disintegrated slurry was taken out, and a binder solution was added to the mixed and disintegrated slurry. The binder solution was previously prepared by mixing and stirring 10 parts by weight of acrylic resin binder, 1.4 parts by weight of DOP as the plasticizer and 35 parts by weight each of toluene and ethanol as solvents to form a solution.

(4) Then, the mixture was processed 15 times under a pressure of 1300 kg/cm$^2$ by the shear stress-type high-pressure dispersion method at a throughput of 300 cc/min to obtain disperse slurry (final disperse slurry) for producing ceramic green sheets.

The conditions (5 times of processing under a pressure of 1300 kg/cm$^2$ at a throughput of 300 cc/min) for dispersion by the shear stress-type high-pressure dispersion method can apply a maximum shear stress of about 1000 Pa or more or a wall shear rate of about $10^6$ (1/s) or more to the ceramic powder during passage of the mixed and disintegrated slurry through the predetermined passage.

The dispersibility of the thus-obtained disperse slurry was evaluated by the particle size distribution measurement apparatus produced by Micro Track Co., Ltd. D90 was 0.45 μm.

The disperse slurry was dried, and heated to 500° C. to remove the binder, and then the specific surface area was measured. The rate of increase in the specific surface area was only 8% based on the initial specific surface area.

Next, the disperse slurry of this example was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 60 nm, and the density ratio was 1.00.

Next, by using the ceramic green sheet, a monolithic ceramic capacitor was produced.

Since the monolithic ceramic capacitor was produced by the same method as Example 1, description thereof is omitted for avoiding duplication.

As a result of measurement of the short-circuit rate of the monolithic ceramic capacitor, the short-circuit rate was as low as 3.0%. The temperature characteristics of capacitance satisfied X7R.

EXAMPLE 11

(1) First, 100 parts by weight of commercial dielectric material (in this example, a barium titanate ceramic powder) having a particle diameter of 0.2 μm was mixed with 2 parts by weight of anionic dispersant, and 35 parts by weight each of toluene and ethanol to form mixed slurry.

(2) Next, the thus-obtained mixed slurry was processed 2 times under a pressure of 1300 kg/cm$^2$ by the impact force-type high-pressure dispersion method at a throughput of 300 cc/min to obtain mixed and disintegrated slurry.

(3) Then, the mixed and disintegrated slurry was taken out, and processed 10 times under a pressure of 1300 kg/cm$^2$ by the shear stress-type high-pressure dispersion method at a throughput of 300 cc/min to obtain disperse slurry (primary disperse slurry).

The conditions (10 times of processing under a pressure of 1300 kg/cm$^2$ at a throughput of 300 cc/min) for dispersion by the shear stress-type high-pressure dispersion method can apply a maximum shear stress of about 1000 Pa or more or a wall shear rate of about $10_6$ (1/s) or more to ceramic powder during passage of the mixed and disintegrated slurry through the predetermined passage.

(4) Then, a binder solution was added to the primary disperse slurry. The binder solution was previously prepared by mixing and stirring 10 parts by weight of acrylic resin binder, 1.4 parts by weight of DOP as the plasticizer and 35 parts by weight each of toluene and ethanol as solvents to form a solution.

(5) Then, the mixture was further processed 5 times under a pressure of 1300 kg/cm$^2$ by the shear stress-type high-pressure dispersion method at a throughput of 300 cc/min to obtain secondary disperse slurry (final disperse slurry) for producing ceramic green sheets.

The conditions (5 times of processing under a pressure of 1300 kg/cm$^2$ at a throughput of 300 cc/min) for dispersion by the shear stress-type high-pressure dispersion method can also apply a maximum shear stress of about 1000 Pa or more or a wall shear rate of about $10^6$ (1/s) or more to ceramic powder during passage of the mixed and disintegrated slurry through the predetermined passage.

The dispersibility of the thus-obtained final disperse slurry was evaluated by the particle size distribution measurement apparatus produced by Micro Track Co., Ltd. D90 was 0.42 μm.

The final disperse slurry was dried, and heated to 500° C. to remove the binder, and then the specific surface area was measured. The rate of increase in the specific surface area was only 8% based on the initial specific surface area.

Next, the disperse slurry of this example was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 55 nm, and the density ratio was 1.00.

Next, by using the ceramic green sheet, a monolithic ceramic capacitor was produced.

Since the monolithic ceramic capacitor was produced by the same method as Example 1, description thereof is omitted for avoiding duplication.

As a result of measurement of the short-circuit rate of the monolithic ceramic capacitor, the short-circuit rate was as low as 3.0%. The temperature characteristics of capacitance satisfied X7R.

EXAMPLE 12

(1) First, 100 parts by weight of commercial dielectric material (in this example, a barium titanate ceramic powder) having a particle diameter of 0.2 µm was mixed with 2 parts by weight of anionic dispersant, and 35 parts by weight each of toluene and ethanol to form mixed slurry.

(2) Next, the thus-obtained mixed slurry was processed 2 times under a pressure of 1300 kg/cm$^2$ by the impact force-type high-pressure dispersion method at a throughput of 300 cc/min to obtain mixed and disintegrated slurry.

(3) Then, the mixed and disintegrated slurry was taken out, and processed 10 times under a pressure of 1300 kg/cm$^2$ by the shear stress-type high-pressure dispersion method at a throughput of 300 cc/min to obtain disperse slurry (primary disperse slurry).

The conditions (10 times of processing under a pressure of 1300 kg/cm$^2$ at a throughput of 300 cc/min) for dispersion by the shear stress-type high-pressure dispersion method can apply a maximum shear stress of about 1000 Pa or more or a wall shear rate of about $10^6$ (1/s) or more to ceramic powder during passage of the mixed and disintegrated slurry through the predetermined passage.

(4) Then, a binder solution was added to the primary disperse slurry. The binder solution was previously prepared by mixing and stirring 10 parts by weight of acrylic resin binder, 1.4 parts by weight of DOP as the plasticizer and 35 parts by weight each of toluene and ethanol as solvents to form a solution, and heating the solution under reflux at 65° C. for 5 hours.

(5) Then, the mixture was further processed 5 times under a pressure of 1300 kg/cm$^2$ by the shear stress-type high-pressure dispersion method at a throughput of 300 cc/min to obtain secondary disperse slurry (final disperse slurry) for producing ceramic green sheets.

The conditions (5 times of processing under a pressure of 1300 kg/cm$^2$ at a throughput of 300 cc/min) for dispersion by the shear stress-type high-pressure dispersion method can also apply a maximum shear stress of about 1000 Pa or more or a wall shear rate of about $10^6$ (1/s) or more to ceramic powder during passage of the mixed and disintegrated slurry through the predetermined passage.

The dispersibility of the thus-obtained final disperse slurry was evaluated by the particle size distribution measurement apparatus produced by Micro Track Co., Ltd. D90 was 0.42 µm.

The final disperse slurry was dried, and heated to 500° C. to remove the binder, and then the specific surface area was measured. The rate of increase in the specific surface area was only 8% based on the initial specific surface area.

Next, the disperse slurry of this example was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 55 nm, and the density ratio was 1.00.

Next, by using the ceramic green sheet, a monolithic ceramic capacitor was produced.

Since the monolithic ceramic capacitor was produced by the same method as Example 1, description thereof is omitted for avoiding duplication.

As a result of measurement of the short-circuit rate of the monolithic ceramic capacitor, the short-circuit rate was as low as 1.5%. The temperature characteristics of capacitance satisfied X7R.

EXAMPLE 13

(1) First, 100 parts by weight of commercial dielectric material (in this example, a barium titanate ceramic powder) having a particle diameter of 0.2 µm was mixed with 2 parts by weight of anionic dispersant and 35 parts by weight each of toluene and ethanol to form mixed slurry.

(2) Next, the thus-obtained mixed slurry was processed 2 times under a pressure of 1300 kg/cm$^2$ by the impact force-type high-pressure dispersion method at a throughput of 300 cc/min to obtain mixed and disintegrated slurry.

(3) Then, the mixed and disintegrated slurry was taken out, and processed 10 times under a pressure of 1300 kg/cm$^2$ by the shear stress-type high-pressure dispersion method at a throughput of 300 cc/min to obtain disperse slurry (primary disperse slurry).

The conditions (10 times of processing under a pressure of 1300 kg/cm$^2$ at a throughput of 300 cc/min) for dispersion by the shear stress-type high-pressure dispersion method can apply a maximum shear stress of about 1000 Pa or more or a wall shear rate of about $10^6$ (1/s) or more to ceramic powder during passage of the mixed and disintegrated slurry through the predetermined passage.

(4) Then, a binder solution was added to the primary disperse slurry. The binder solution was previously prepared by mixing and stirring 10 parts by weight of acrylic resin binder, 1.4 parts by weight of DOP as the plasticizer and 35 parts by weight each of toluene and ethanol as solvents to form a solution, and processing 5 times the solution under a pressure of 1300 kg/cm$^2$ by the shear stress-type high-pressure dispersion method at a throughput of 300 cc/min.

(5) Then, the mixture was further processed 5 times under a pressure of 1300 kg/cm$^2$ by the shear stress-type high-pressure dispersion method at a throughput of 300 cc/min to obtain secondary disperse slurry (final disperse slurry) for producing ceramic green sheets.

The conditions (5 times of processing under a pressure of 1300 kg/cm$^2$ at a throughput of 300 cc/min) for dispersion by the shear stress-type high-pressure dispersion method can also apply a maximum shear stress of about 1000 Pa or more or a wall shear rate of about $10^6$ (1/s) or more to ceramic powder during passage of the mixed and disintegrated slurry through the predetermined passage.

The dispersibility of the thus-obtained final disperse slurry was evaluated by the particle size distribution measurement apparatus produced by Micro Track Co., Ltd. D90 was 0.42 µm.

The final disperse slurry was dried, and heated to 500° C. to remove the binder, and then the specific surface area was measured. The rate of increase in the specific surface area was only 8% based on the initial specific surface area.

Next, the disperse slurry of this example was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 55 nm, and the density ratio was 1.00.

Next, by using the ceramic green sheet, a monolithic ceramic capacitor was produced.

Since the monolithic ceramic capacitor was produced by the same method as Example 1, description thereof is omitted for avoiding duplication.

As a result of measurement of the short-circuit rate of the monolithic ceramic capacitor, the short-circuit rate was as low as 0.5%. The temperature characteristics of capacitance satisfied X7R.

EXAMPLE 14

Disperse slurry was produced under the same conditions as Example 9 except that polyvinyl butyral was used as the binder, and a ceramic green sheet was produced by using the disperse slurry.

The dispersibility of the disperse slurry produced in this example was evaluated by the particle size distribution measurement apparatus produced by Micro Track Co., Ltd. D90 was 0.45 µm.

The final disperse slurry was dried, and heated to 500° C. to remove the binder, and then the specific surface area was measured. The rate of increase in the specific surface area was only 8% based on the initial specific surface area.

Next, the disperse slurry of this example was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. As a result, Ra was 60 nm, and the density ratio was 1.00.

Next, by using the ceramic green sheet, a monolithic ceramic capacitor was produced.

Since the monolithic ceramic capacitor was produced by the same method as Example 1, description thereof is omitted for avoiding duplication.

As a result of measurement of the short-circuit rate of the monolithic ceramic capacitor, the short-circuit rate was as low as 3.0%. The temperature characteristics of capacitance satisfied X7R.

COMPARATIVE EXAMPLE 5

Disperse slurry was produced under the same conditions as Example 9 except that the impact force-type high-pressure dispersion method used in Examples 9 to 14 was changed to the dispersion method using the sand mill, and a ceramic green sheet was produced by using the disperse slurry.

The dispersibility of the disperse slurry produced in this example was evaluated by the particle size distribution measurement apparatus produced by Micro Track Co., Ltd. D90 was 0.60 µm.

The final disperse slurry was dried, and heated to 500° C. to remove the binder, and then the specific surface area was measured. The rate of increase in the specific surface area was 30% based on the initial specific surface area.

Next, the disperse slurry of this example was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 110 nm, and the density ratio was 0.80.

Next, by using the ceramic green sheet, a monolithic ceramic capacitor was produced.

Since the monolithic ceramic capacitor was produced by the same method as Example 1, description thereof is omitted for avoiding duplication.

As a result of measurement of the short-circuit rate of the monolithic ceramic capacitor, the short-circuit rate was as high as 50%. The temperature characteristics of capacitance did not satisfy X7R.

COMPARATIVE EXAMPLE 6

Disperse slurry was produced under the same conditions as Example 9 except that slurry was dispersed under a pressure of 50 kg/cm$^2$ by the shear stress-type high-pressure dispersion method in place of 1300 kg/cm$^2$, and a ceramic green sheet was produced by using the disperse slurry.

The dispersibility of the disperse slurry produced in this example was evaluated by the particle size distribution measurement apparatus produced by Micro Track Co., Ltd. D90 was 0.60 µm.

The final disperse slurry was dried, and heated to 500° C. to remove the binder, and then the specific surface area was measured. The rate of increase in the specific surface area was 7% based on the initial specific surface area.

Next, the disperse slurry of this example was formed in a sheet by the doctor blade method to form a ceramic green sheet.

The surface roughness (Ra) of the thus-formed ceramic green sheet was measured by the atomic force microscope, and the ratio (measured density/theoretical density) of measured density to theoretical density was determined as the density ratio of the ceramic green sheet. Ra was 110 nm, and the density ratio was 0.80.

Next, by using the ceramic green sheet, a monolithic ceramic capacitor was produced.

Since the monolithic ceramic capacitor was produced by the same method as Example 1, description thereof is omitted for avoiding duplication.

As a result of measurement of the short-circuit rate of the monolithic ceramic capacitor, the short-circuit rate was as high as 45%. The temperature characteristics of capacitance satisfies X7R.

The dispersibility of the disperse slurry (final disperse slurry) obtained in each of Examples 9 to 14 and Comparative Examples 5 and 6, the specific surface area after binder removal, the surface roughness and density ratio of each of the produced ceramic green sheets, and the short-circuit rate and the temperature characteristics of capacitance of each of the monolithic ceramic capacitors are summarized in Table 2.

TABLE 2

|  | Dispersibility D90 (μm) | Rate of increase in specific surface area (%) | Surface roughness of sheet Ra(nm) | Density ratio of sheet (measured density/theoretical density) | Short-circuit rate (%) | Temperature characteristics of capacitance |
|---|---|---|---|---|---|---|
| Example 9 | 0.45 | 8 | 60 | 1.00 | 3.0 | X7R |
| Example 10 | 0.45 | 8 | 60 | 1.00 | 3.0 | X7R |
| Example 11 | 0.42 | 8 | 55 | 1.00 | 3.0 | X7R |
| Example 12 | 0.42 | 8 | 55 | 1.00 | 1.5 | X7R |
| Example 13 | 0.42 | 8 | 55 | 1.00 | 0.5 | X7R |
| Example 14 | 0.45 | 8 | 60 | 1.00 | 3.0 | X7R |
| Comparative Example 5 | 0.60 | 30 | 110 | 0.80 | 50 | B |
| Comparative Example 6 | 0.60 | 7 | 110 | 0.80 | 45 | X7R |

The present invention is not limited to the above-described examples, and in the scope of the gist of the invention, various applications and modifications can be made with respect to the types of a ceramic powder and a dispersion solvent, the construction of the high-pressure dispersion apparatus used for high-pressure dispersion, the types and adding amounts of additives such as a dispersant, a plasticizer, an antistatic agent, and the like, etc.

EXAMPLE 15

(1) First, a ceramic powder, a dispersant and a solvent were mixed at the following ratio:
  (a) Dielectric material (ceramic powder containing additives) having an average particle diameter of 0.2 μm: 100 parts by weight
  (b) Anionic dispersant: 2 parts by weight
  (c) Solvent—toluene: 35 parts by weight, ethanol: 35 parts by weight (2) Next, 500 parts by weight of zirconia balls having a diameter of 2 mm were added to the mixed raw materials, and the mixture was mixed and disintegrated in a ball mill for 5 hours to obtain primary ceramic slurry.

(3) On the other hand, a binder, a plasticizer, and a solvent were mixed at the following ratio, and stirred, followed by 5 times of processing (high-pressure dispersion) under a pressure of 500 kg/cm$^2$ to obtain a binder solution:
  (a) Binder (acrylic resin binder): 10 parts by weight
  (b) Plasticizer "DOP": 1.4 parts by weight
  (c) Solvent-toluene: 100 parts by weight, ethanol: 100 parts by weight (4) Next, the binder solution was added to the primary ceramic slurry, and the mixture was mixed and dispersed by a ball mill for 16 hours to obtain a ceramic slurry composition.

Then, the thus-obtained ceramic slurry composition was formed in a sheet by the doctor blade method to form a ceramic green sheet.

By using the ceramic green sheet, a monolithic ceramic capacitor was produced, in which the internal electrodes 2 were provided in the ceramic element 1, and a pair of the external electrodes 3a and 3b were provided at both ends of the ceramic element 1 so as to be connected to the internal electrodes 2 which were alternately led to the different side ends, as shown in FIG. 1.

The monolithic ceramic capacitor was produced by the same method as Example 1.

As a result of measurement of the short-circuit rate of the monolithic ceramic capacitor, the short-circuit rate was as low as 13%. The temperature characteristics of capacitance satisfied X7R.

EXAMPLE 16

A ceramic slurry composition was produced under the same conditions as Example 15 except that the acrylic resin binder was changed to a polyvinyl butyral resin binder.

A ceramic green sheet was produced by using the thus-produced ceramic slurry composition, and a monolithic ceramic capacitor was produced by using the ceramic green sheet. The ceramic green sheet and the monolithic ceramic capacitor were produced by the same method as Example 15.

As a result of measurement of the short-circuit rate of the monolithic ceramic capacitor, the short-circuit rate was as low as 9%. The temperature characteristics of capacitance satisfied X7R.

EXAMPLE 17

A ceramic slurry composition was produced under the same conditions as Example 15 except that the dispersant, the binder and the solvent were changed to a water-soluble anionic dispersant, a water-soluble acrylic resin binder and water, respectively.

A ceramic green sheet was produced by using the thus-produced ceramic slurry composition, and a monolithic ceramic capacitor was produced by using the ceramic green sheet. The ceramic green sheet and the monolithic ceramic capacitor were produced by the same method as Example 15.

As a result of measurement of the short-circuit rate of the monolithic ceramic capacitor, the short-circuit rate was as low as 16%. The temperature characteristics of capacitance satisfied X7R.

EXAMPLE 18

A ceramic slurry composition was produced under the same conditions as Example 15 except that a binder solution (filtered binder solution) filtered with a filter having a pore size of 0.1 μm or less with 99% cut filtration precision was used.

A ceramic green sheet was produced by using the thus-produced ceramic slurry composition, and a monolithic ceramic capacitor was produced by using the ceramic green sheet. The ceramic green sheet and the monolithic ceramic capacitor were produced by the same method as Example 15.

As a result of measurement of the short-circuit rate of the monolithic ceramic capacitor, the short-circuit rate was as low as 6%. The temperature characteristics of capacitance satisfied X7R.

EXAMPLE 19

A ceramic slurry composition was produced under the same conditions as Example 16 except that the pressure of high-pressure dispersion was 1000 kg/cm$^2$, and a binder solution filtered with a filter having a pore size of 0.1 µm or less with 99% cut filtration precision was used.

A ceramic green sheet was produced by using the thus-produced ceramic slurry composition, and a monolithic ceramic capacitor was produced by using the ceramic green sheet. The ceramic green sheet and the monolithic ceramic capacitor were produced by the same method as Example 15.

As a result of measurement of the short-circuit rate of the monolithic ceramic capacitor, the short-circuit rate was as low as 4%. The temperature characteristics of capacitance satisfied X7R.

COMPARATIVE EXAMPLE 7

A ceramic slurry composition was produced under the same conditions as Example 15 except that the binder was stirred and mixed without high-pressure dispersion.

A ceramic green sheet was produced by using the thus-produced ceramic slurry composition, and a monolithic ceramic capacitor was produced by using the ceramic green sheet. The ceramic green sheet and the monolithic ceramic capacitor were produced by the same method as Example 15.

As a result of measurement of the short-circuit rate of the monolithic ceramic capacitor, the short-circuit rate was as high as 49%. The temperature characteristics of capacitance satisfied X7R.

COMPARATIVE EXAMPLE 8

A ceramic slurry composition was produced under the same conditions as Example 16 except that the pressure of high-pressure dispersion was 50 kg/cm$^2$.

A ceramic green sheet was produced by using the thus-produced ceramic slurry composition, and a monolithic ceramic capacitor was produced by using the ceramic green sheet. The ceramic green sheet and the monolithic ceramic capacitor were produced by the same method as Example 15.

As a result of measurement of the short-circuit rate of the monolithic ceramic capacitor, the short-circuit rate was as high as 37%. The temperature characteristics of capacitance satisfied X7R.

The present invention is not limited to the above examples, and in the scope of the gist of the present invention, various applications and modifications can be made with respect to the types of the ceramic powder and the solvent, the dispersion method and conditions, etc.

As described above, in the method of producing a ceramic slurry composition of the present invention, which comprises a ceramic powder, a dispersant, a binder, and a solvent, a binder solution previously prepared by mixing the solvent and the binder to form a solution, and then dispersing the binder in the solution under a high pressure of about 100 kg/cm$^2$ or more is used as the binder. Therefore, a ceramic slurry composition containing less undissolved binder can be efficiently produced.

Since the viscosity of the binder is decreased by high-pressure dispersion to facilitate filtration with a filter having a small power size, the undissolved material can be efficiently removed by filtering the binder solution. Therefore, ceramic slurry from which the undissolved material is precisely removed can be securely produced to make the present invention more effective.

The ceramic slurry composition of the present invention comprises a ceramic powder, a dispersant, a binder, and a solvent, wherein a binder solution prepared by mixing the solvent and the binder to form a solution, and then dispersing the binder in the solution under a high pressure of about 100 kg/cm$^2$ or more is used as the binder. Since the binder solution subjected to high-pressure dispersion has excellent solubility of the binder, ceramic slurry containing less undissolved binder can be obtained. By using the ceramic slurry composition of the present invention, a ceramic green sheet having less defects can be efficiently produced.

Since the viscosity of the binder is decreased by high-pressure dispersion to facilitate filtration with a filter having a small pore size, the undissolved material can be efficiently removed by filtering the binder solution. Therefore, ceramic slurry containing a smaller amount of undissolved material can be securely obtained by filtration of the binder solution.

The present invention is useful for application to a ceramic slurry composition for producing a thin ceramic green sheet, which comprises a fine ceramic powder having an average particle diameter of about 0.01 to 1 µm, and permits the efficient production of a ceramic green sheet having less defects.

Since the ceramic slurry composition of the present invention contains less undissolved binder or substantially no undissolved binder, the ceramic slurry composition is formed in a sheet to securely produce a high-quality thin ceramic green sheet having less defects. By using the ceramic green sheet, a high-quality multilayer ceramic electronic part having desired properties and high reliability can be produced.

In producing a thin ceramic green sheet (thickness=0.1 to 1 µm), a high-quality ceramic green sheet can securely be produced, which is suitable for use for producing a multilayer ceramic electronic part.

The method of producing a multilayer ceramic electronic part of the present invention comprises laminating a plurality of the ceramic green sheets produced by the method of the present invention together with base metal internal electrodes, cutting and burning the laminated product, and then forming external electrodes. Since the ceramic green sheets having less defects are used, a multilayer ceramic electronic part exhibiting a low short-circuit rate and high reliability can efficiently be produced.

What is claimed is:

1. A method of producing ceramic slurry used for producing a ceramic electronic part comprising:
   mixing disintegrating a mixture of a ceramic powder having an average particle diameter of about 0.01 to 1 µm with a dispersion solvent by a medium-type dispersion method to obtain mixed and disintegrated slurry; and
   dispersing the mixed and disintegrated slurry under a high pressure of at least about 100 kg/cm$^2$ to obtain a disperse slurry, wherein said mixed and disintegrated slurry when it is being dispersed under high pressure comprises a binder.

2. A method of producing ceramic slurry according to claim 1, wherein said mixture comprises a binder.

3. A method of producing ceramic slurry according to claim 2, wherein said binder comprises a high pressure dispersed mixture of solvent and binder, wherein said high pressure is at least about 100 kg/cm$^2$.

4. A method of producing ceramic slurry according to claim 2, wherein said binder comprises a mixture of solvent and binder conditioned by heating under reflux at about 40 to 100° C.

5. A method of producing ceramic slurry according to claim 1, wherein the mixture of ceramic powder and dispersion solvent does not contain a binder and is dispersed under a high pressure of at least about 100 kg/cm² to obtain a preliminary disperse slurry, a binder is added to the preliminary disperse slurry, and the resultant mixture is dispersed under a high pressure of at least about 100 kg/cm² to obtain said disperse slurry.

6. A method of producing ceramic slurry according to claim 1, wherein the mixture of ceramic powder and dispersion solvent is subjected to mixing disintegration to form a preliminary mixture, a binder is added to the preliminary mixture, and the mixing disintegrating is repeated prior to said high pressure dispersion.

7. A method of producing ceramic slurry according to claim 1, wherein the disperse slurry has a viscosity of about 0.01 to 0.1 Pas.

8. A method of producing ceramic slurry according to claim 1, wherein the mixing disintegrating is effected in a ball mill or a bead mill.

9. A method of producing a green sheet comprising applying a ceramic slurry produced by the method according to claim 1 as a sheet layer on a substrate to form a ceramic green sheet having a thickness of about 0.1 to 10 μm.

10. A method of producing a multilayer ceramic electronic part comprising forming ceramic green sheets with a ceramic slurry produced by the method of according to claim 1, laminating a plurality of said ceramic green sheets together with base metal internal electrodes, burning the resulting laminated product, and then forming external electrodes on the burned product.

11. A method of producing ceramic slurry comprising passing under high pressure a slurry comprising a ceramic powder having an average particle diameter of about 0.01 to 1 μm and a dispersion solvent through a passage at a flow rate to apply a maximum shear stress of at least about 1000 Pa or a wall shear rate of at least about $10^6$ (1/s) to the ceramic powder to disperse the ceramic powder in the slurry, wherein the passage has a substantially linear portion which does not have a bent portion having a bending angle of 100° or less or a curved portion having a curvature radius of 3 mm or less upstream or downstream of the substantially linear portion, and wherein the ratio $R_{L/D}$ of length to characteristic diameter of the passage is $$30 \leq R_{L/D} \leq 1000$$

wherein the characteristic diameter represents the following according to the sectional shape perpendicular to the axial direction:
 (a) the short side of a rectangular sectional shape;
 (b) the diameter of a circular shape;
 (c) the short diameter of an elliptical shape; and
 (d) the average depth of a fluid (=4×passage sectional area/total wetted length) in other sectional shapes.

12. A method of producing ceramic slurry according to claim 11, wherein the slurry is passed through the passage under a pressure of at least about 100 kg/cm².

13. A method of producing a ceramic green sheet of the present invention comprising forming ceramic slurry produced by the method according to claim 11 as a sheet layer on a substrate to form a ceramic green sheet having a thickness of about 0.1 to 10 μm.

14. A method of producing a multilayer ceramic electronic part comprising forming ceramic green sheets with the ceramic slurry produced by the method according to claim 11, laminating a plurality of the ceramic green sheets together with base metal internal electrodes, burning the laminated product, and then forming external electrodes on the burned product.

15. A method of producing ceramic slurry used for manufacturing a ceramic electronic part comprising:

impact force high-pressure dispersing a mixture of a ceramic powder having an average particle diameter of about 0.01 to 1 μm and a dispersion solvent, wherein the pressure is at least about 100 kg/cm² to disintegrate the ceramic powder to a desired state and dispersed it in the solvent and thereby obtain mixed and disintegrated slurry; and shear stress high-pressure dispersing the mixed and disintegrated slurry by passing it through a passage under a high pressure of at least about 100 kg/cm² at a flow rate which applies a maximum shear stress of at least about 1000 Pa or a wall shear rate of at least about $10^6$ (1/s) to the ceramic powder to thereby obtain a disperse slurry, wherein the passage has a substantially linear portion which does not have a bent portion having a bending angle of 100° or less or a curved portion having a curvature radius of 3 mm or less upstream or downstream of the substantially linear portion, and wherein the ratio $R_{L/D}$ of length to characteristic diameter of the passage is $$30 \leq R_{L/D} \leq 1000$$

wherein the characteristic diameter represents the following according to the sectional shape perpendicular to the axial direction:
 (a) the short side of a rectangular sectional shape;
 (b) the diameter of a circular shape;
 (c) the short diameter of an elliptical shape; and
 (d) the average depth of a fluid (=4×passage sectional area/total wetted length) in other sectional shapes.

16. A method of producing ceramic slurry according to claim 15, wherein the impact force high-pressure dispersing comprises causing the mixture to collide with a solid wall of hard material at a velocity of at least about 100 m/s or causing portions of the mixture to be ejected from a plurality of opposite nozzles so as to collide with each other at a velocity of at least about 50 m/s.

17. A method of producing ceramic slurry according to claim 16, wherein a binder is present in the mixture during the impact force high-pressure dispersing or the shear stress high-pressure dispersing or both.

18. A method of producing ceramic slurry according to 17, wherein the binder is a mixture of solvent and binder which has been subject to said shear stress high-pressure dispersing.

19. A method of producing ceramic slurry according to claim 17, wherein the binder is a solution of solvent and binder conditioned at reflux at about 40 to 100° C.

20. A method of producing ceramic slurry used for manufacturing a ceramic electronic part according to claim 16, comprising adding a binder to the disperse slurry, and repeating the shear stress high-pressure dispersing to obtain secondary disperse slurry.

21. A method of producing ceramic slurry according to claim 16, wherein the disperse slurry has a viscosity of about 0.003 to 0.1 Pas.

22. A method of producing a green sheet comprising forming ceramic slurry produced by the method according to claim 16 in a sheet layer on a substrate to form a ceramic green sheet having a thickness of about 0.1 to 10 μm.

23. A method of producing a multilayer ceramic electronic part comprising forming ceramic green sheets with the ceramic slurry produced by the method according to claim 16, laminating a plurality of the ceramic green sheets together with base metal internal electrodes, burning the laminated product, and then forming external electrodes on the burned product.

24. A method of producing a ceramic slurry composition comprising mixing ceramic powder, dispersant, binder, and solvent comprising:

mixing
- (a) ceramic powder;
- (b) dispersant; and
- (c) binder dispersed in the solvent under a high pressure of at least about 100 kg/cm$^2$ and dispersing the resultant mixture wherein the binder dispersion is filtered prior to said mixing.

25. A method of producing a ceramic green sheet comprising forming a ceramic slurry composition according to claim 24 in a sheet layer on a substrate to form a ceramic green sheet having a thickness of about 0.1 to 10 μm.

26. A method of manufacturing a multilayer ceramic electronic part comprising laminating a plurality of ceramic green sheets produced by the method according to claim 25 together with base metal internal electrodes, burning the laminated product, and then forming external electrodes on the burned product.

* * * * *